United States Patent
Manolescu

(10) Patent No.: US 7,274,175 B2
(45) Date of Patent: Sep. 25, 2007

(54) MULTIPLE OUTPUT POWER SUPPLY THAT CONFIGURES ITSELF TO MULTIPLE LOADS

(76) Inventor: Mihai-Costin Manolescu, 215 Union Ave., #349, Campbell, CA (US) 95008

( * ) Notice: Subject to any disclaimer, the term of this patent is extended or adjusted under 35 U.S.C. 154(b) by 71 days.

(21) Appl. No.: 11/357,520

(22) Filed: Feb. 16, 2006

(65) Prior Publication Data

US 2007/0030716 A1    Feb. 8, 2007

Related U.S. Application Data

(63) Continuation-in-part of application No. 11/198,288, filed on Aug. 3, 2005.

(51) Int. Cl.
*G05F 1/577*    (2006.01)
(52) U.S. Cl. .......................... 323/267; 323/266; 363/65
(58) Field of Classification Search ................ 323/266, 323/267, 272; 363/65
See application file for complete search history.

(56) References Cited

U.S. PATENT DOCUMENTS

| | | | |
|---|---|---|---|
| 5,210,519 A | 5/1993 | Moore .................... | 340/310.06 |
| 5,347,211 A | 9/1994 | Jakubowski ................ | 323/351 |
| 5,534,768 A * | 7/1996 | Chavannes et al. ......... | 323/267 |
| 6,204,650 B1 * | 3/2001 | Shimamori ................. | 323/283 |
| 6,300,881 B1 | 10/2001 | Yee et al. .............. | 340/870.02 |
| 6,418,037 B1 * | 7/2002 | Zhang ......................... | 363/15 |
| 6,452,367 B2 * | 9/2002 | Watanabe .................. | 323/267 |
| 6,538,341 B1 | 3/2003 | Lang ............................ | 307/18 |
| 6,608,552 B1 | 8/2003 | Fogel et al. ........... | 340/310.01 |
| 6,791,853 B2 | 9/2004 | Afzal et al. ................ | 363/142 |
| 6,903,950 B2 | 6/2005 | Afzal et al. ................ | 363/142 |
| 6,984,965 B2 * | 1/2006 | Vinciarelli .................. | 323/266 |
| 2007/0018620 A1 * | 1/2007 | Fujii .......................... | 323/267 |
| 2007/0024255 A1 * | 2/2007 | Yasumura .................... | 323/267 |

OTHER PUBLICATIONS

Internet pages of Design Within Reach entitled "Multipot Personal Electric Charger", 2 pages, printed Feb. 15, 2006.
Internet page of Hammacher Schlemmer entitled "Multiple Unit Recharging Station", 1 page, printed Feb. 15, 2006.
Internet pages of Splashpower entitled "Solution Overview", 2 pages, printed Feb. 15, 2006.

* cited by examiner

*Primary Examiner*—Jeffrey Sterrett
(74) *Attorney, Agent, or Firm*—Imperium Patent Works; T. Lester Wallace

(57) ABSTRACT

A two stage multiple output power supply device is capable of outputting programmable DC voltages onto multiple outputs. The first stage receives an AC supply voltage and outputs a DC supply voltage. The second stage includes a DC-ID controller and multiple DC-to-DC converters, each DC-to-DC converter receiving the DC supply voltage and capable of outputting a programmable DC voltage onto a conductor of a power cord to power an electrical device. For each DC-to-DC converter, the DC-ID controller receives information in an AC signal on the conductor, the information indicating the voltage and current requirements and the polarity of an electrical device connected to the power cord for that DC-to-DC converter. In response to the information, the DC-ID controller controls the DC-to-DC converter to set a magnitude, a polarity and a current limit for the programmable DC voltage that will be output by the DC-to-DC converter.

24 Claims, 10 Drawing Sheets

MULTIPLE OUTPUT POWER SUPPLY THAT CONFIGURES ITSELF TO MULTIPLE LOADS

CROSS-REFERENCE TO RELATED APPLICATION

This application is a continuation-in-part of, and claims the benefit under 35 U.S.C. 120 to, U.S. patent application Ser. No. 11/198,288, filed Aug. 3, 2005. The subject matter of U.S. patent application Ser. No. 11/198,288 is incorporated herein by reference.

BACKGROUND INFORMATION

Small consumer electrical devices (for example, digital cameras, digital music players, cellular telephones, personal digital assistants, laptop computers) typically have a jack or socket for receiving DC (direct current) voltage power. An AC-to-DC converter is typically supplied with the electrical device. The AC-to-DC converter has a wall plug for plugging the AC-to-DC converter into an AC wall socket. The AC-to-DC converter also has a power cord that terminates in a plug. To power the electrical device from power received from the wall socket, the plug of the AC-to-DC converter is plugged into the receiving DC power input socket of the electrical device. The electrical device is then powered by a DC voltage received from the converter.

A consumer may have many different electrical devices, each of which is to be powered from a different DC voltage and may have a different type of DC power input socket. As a result, the consumer may have a confusing mess of similar, yet different,. AC-to-DC converters for powering these many consumer devices. It would be nice for the consumer to have a single AC-to-DC converter that would be usable to power any one of the multiple different electrical devices.

A device sometimes called a universal AC-to-DC converter exists. The power cord of a universal AC-to-DC converter typically terminates in a plurality of plugs of different types and sizes. Hopefully, one of the plugs will fit into the DC voltage input power socket of an electrical device to be powered. If one of the plugs fits, then the consumer can manipulate a switch on the AC-to-DC converter to select one of a plurality of possible DC output voltages. The AC-to-DC converter may also include a switch for switching the polarity of the DC voltage that is output onto the contacts of the adapter's plugs.

Such universal AC-to-DC converters are, unfortunately, considered cumbersome to use. In some cases, the switch can inadvertently be moved when the converter is in use, resulting in an improper and potentially damaging voltage being applied to the electrical device. Moreover, the number of different selectable output voltages is often quite limited due to the expense of providing a large, many position switch to select the output voltage.

In addition to the universal AC-to-DC converter being cumbersome to use, a universal AC-to-DC converter does not provide a simple automatic way of determining whether the AC-to-DC converter will be able to supply enough output current to power a desired electrical device properly. The consumer is left to check the specifications of the electrical device to be powered with the output capabilities of the universal converter. This is an inconvenient exercise.

An elegant solution is desired.;

SUMMARY

In one novel aspect, a power supply device includes a programmable DC power supply that is capable of outputting a DC output supply voltage onto a plug of at the end of a power cord. The power supply device also contains a DC-Identification Controller (DC-ID CNTR).

An electrical device is coupled to receive a DC supply voltage via the power cord from the power supply device. The electrical device includes a DC load to be powered as well as a DC-Identification device (DC-ID). The DC-ID contains a memory that stores information about the power requirements of the electrical device.

The DC-ID CNTR in the power supply device is AC coupled through the power cord to the DC-ID in the electrical device. A voltage output lead of the programmable DC power supply in the power supply device is DC coupled via the power cord to the DC load in the electrical device.

Initially, the DC-ID in the electrical device is unpowered. The power supply device is not supplying DC supply power to the electrical device. When the power supply device is not powering the electrical device, the DC-ID CNTR in the power supply device sends an AC signal across the power cord to the DC-ID in the electrical device. The AC signal is present on the power cord as a pulse train.

The DC-ID captures energy from the AC signal. The DC-ID uses the captured energy to read the information out of its memory. Once the power supply device has stopped driving the AC signal onto the power cord, then the DC-ID in the electrical device uses the captured energy to transmit the information back to the DC-ID CNTR in the power supply device across the power cord. The information is communicated across the power cord in the form of another AC signal.

The DC-ID CNTR receives the AC signal, extracts the information, and uses the information to control the programmable DC power supply so that the programmable DC power supply outputs the appropriate DC supply voltage for the electrical device onto the power cord. Because the voltage output lead of the programmable DC power supply is DC coupled through the power cord to the DC load, the programmable DC power supply powers the DC load with the correct DC supply voltage. In one embodiment, the DC-ID CNTR is integrated as part of a power management integrated circuit or a switching-mode power supply controller of a power supply.

In another novel aspect, a two stage multiple output power supply device is capable of outputting programmable DC voltages onto multiple outputs. The first stage receives an AC supply voltage and outputs a DC supply voltage. The second stage includes a DC-Identification Controller (DC-ID CNTR) and multiple DC-to-DC converters. Each DC-to-DC converter receives the DC supply voltage and is capable of outputting a programmable DC voltage onto a conductor of a power cord to power an electrical device.

An electrical device is coupled to receive a programmable DC voltage via one of the power cords of the multiple output power supply device. The electrical device includes a DC load to be powered as well as a DC-Identification device (DC-ID). The DC-ID contains a memory that stores information about the power requirements of the electrical device.

The DC-ID CNTR in the multiple output power supply device is AC coupled through the power cord to the DC-ID in each electrical device. A voltage output lead of each DC-to-DC converter in the multiple output power supply device is DC coupled via the power cord to the DC load in each electrical device.

Depending upon the needs of the user, there may be zero, one, or several electrical devices connected to power cords of the multiple output power supply device. Initially, the DC-ID in each electrical device is unpowered. The multiple output power supply device is not supplying DC supply power to any of the electrical devices. The DC-ID CNTR in the multiple output power supply device outputs an AC signal onto one of the power cords. The AC signal is present on the power cord as a pulse train. If no electrical device is connected to the power cord that carries the AC signal, no reply AC signal is returned, and the DC-ID CNTR switches to the next power cord and outputs an AC signal.

If an electrical device is connected to the power cord that carries the AC signal, the DC-ID in the electrical device captures energy from the AC signal. The DC-ID uses the captured energy to read information out of its memory. Once the multiple output power supply device has stopped driving the AC signal onto the power cord, then the DC-ID in the electrical device uses the captured energy to transmit the information back to the DC-ID CNTR in the multiple output power supply device across the power cord. The information is communicated across the power cord in the form of another AC signal.

A microcontroller in the DC-ID CNTR receives the AC signal, extracts the information, and uses the information to control the DC-to-DC converter that is DC coupled to the power cord that received the AC signal from the DC-ID. The information includes the voltage, maximum current demand, and polarity requirements of the electrical device. The DC-to-DC converter, under control of the microcontroller, outputs a programmable DC voltage of the correct magnitude and polarity for the electrical device onto the power cord. Because the voltage output lead of the DC-to-DC converter is DC coupled through the power cord to the DC load, the DC-to-DC converter powers the DC load with the correct programmable DC voltage.

The DC-ID CNTR outputs an AC signal periodically onto each power cord in turn. If an AC reply signal is returned, indicating that an electrical device is connected to the power cord, the DC-ID CNTR causes the DC-to-DC converter coupled to that power cord to power the electrical device correctly. The microcontroller in the DC-ID CNTR keeps track of the total power required by all of the electrical devices. If the total power requirement is higher than the power that is available from the multiple output power supply device, the user is notified via a user interface.

The information returned by the electrical device to the DC-ID CNTR can include information about the status of the electrical device. The DC-ID CNTR can use that information for various purposes such as increasing the safety of the electrical device. The status information can include, for example, temperature information. If the status information indicates a problem in the electrical device, the DC-ID CNTR can take corrective action such as turning off the programmable DC voltage supplied to the electrical device.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
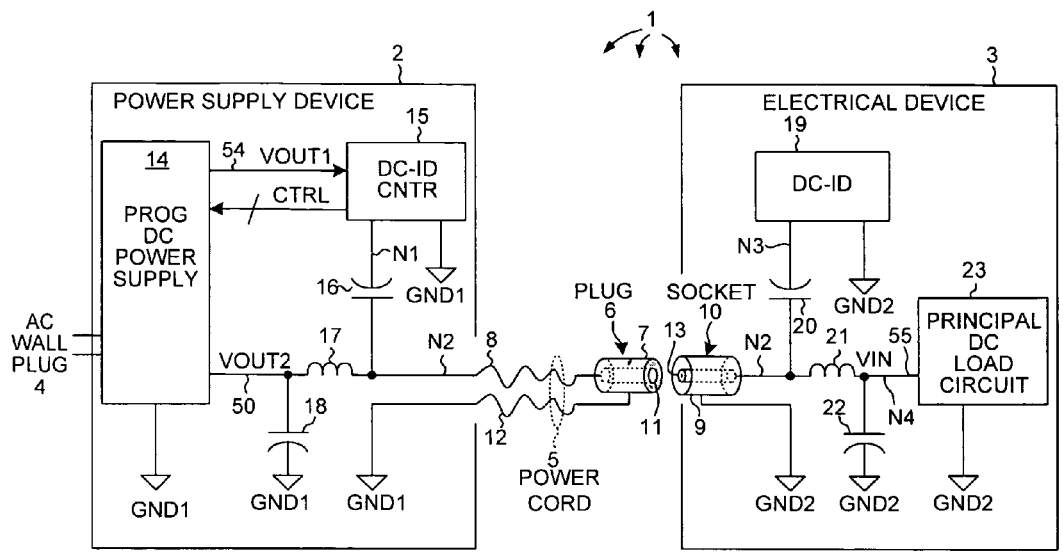
FIG. 1 is a diagram of a system 1 involving a power supply device 2 and an electrical device 3.

FIG. 1 is a diagram of a system 1 in accordance with one novel aspect. System 1 includes a power supply device 2 and an electrical device 3. Power supply device 2 includes an AC wall plug 4. When the AC wall plug 4 is plugged into an AC wall socket (not shown), the power supply device 2 draws power from the wall socket. Power supply device 2 also includes a power cord 5 that terminates in a DC power supply connector 6. In the present example, DC power supply connector 6 is a two-contact male barrel plug often used to supply DC power to electrical devices. Plug 6 has an outer barrel-shaped conductive contact 7 that is coupled to a first conductor 8 of the power cord 5. Barrel contact 7 is adapted to engage a female barrel shaped contact 9 of a female two-contact socket 10 of the electrical device. Plug 6 also has a female inner contact 11 that is coupled to a second conductor 12 of power cord 5. Female inner contact 11 of plug 6 is adapted to engage a pin-like inner contact 13 of socket 10 of electrical device 3.

Power supply device 2 includes power cord 5, plug 6, a programmable DC power supply 14, a DC-Identification Controller (DC-ID CNTR) 15, a first capacitor 16, an inductor 17, and a second capacitor 18. In this embodiment, inductor 17 has an inductance of 33 nF and first capacitor 16 has a capacitance of 47 nF.

Electrical device 3 includes socket 10, a DC-Identification Device (DC-ID) 19, a first capacitor 20, an inductor 21, a second capacitor 22, and the principal DC load circuit to be powered 23. In this embodiment, inductor 21 has an inductance of 33 nF and first capacitor 20 has a capacitance of 47 nF.

DC-ID CNTR 15 in power supply device 2 is AC coupled through conductor 8 to DC-ID 19 in electrical device 3. The voltage output lead 50 of programmable DC power supply 14 is DC coupled through conductor 8 to the DC power supply input lead 55 of the principal DC load 23 of electrical device 3.

Figure 2:
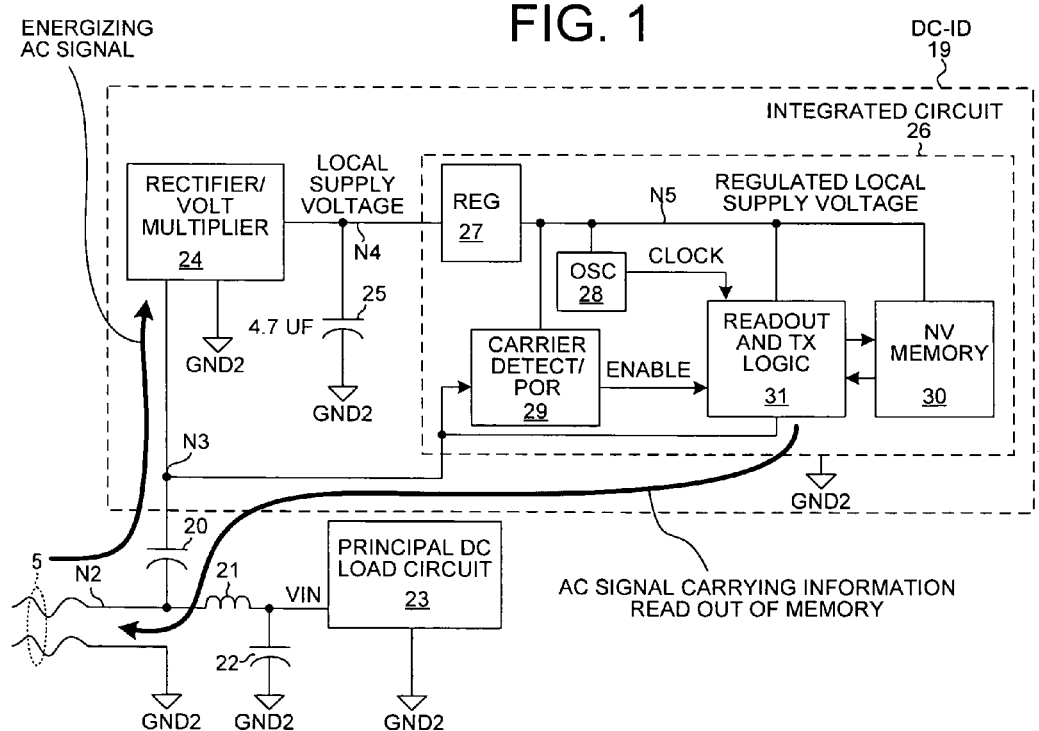
FIG. 2 is a more detailed diagram of electrical device 3 of FIG. 1.

FIG. 2 is a more detailed diagram of electrical device 3 showing details of DC-ID 19. DC-ID 19 includes a rectifier and voltage multiplier circuit 24, an energy storage capacitor 25, and an integrated circuit 26. Integrated circuit 26 is a low-voltage CMOS integrated circuit that includes a voltage regulator 27, an on-chip oscillator 28, carrier detect circuitry 29, an amount of non-volatile memory 30, and readout and transmitting logic circuitry 31.

Figure 3:
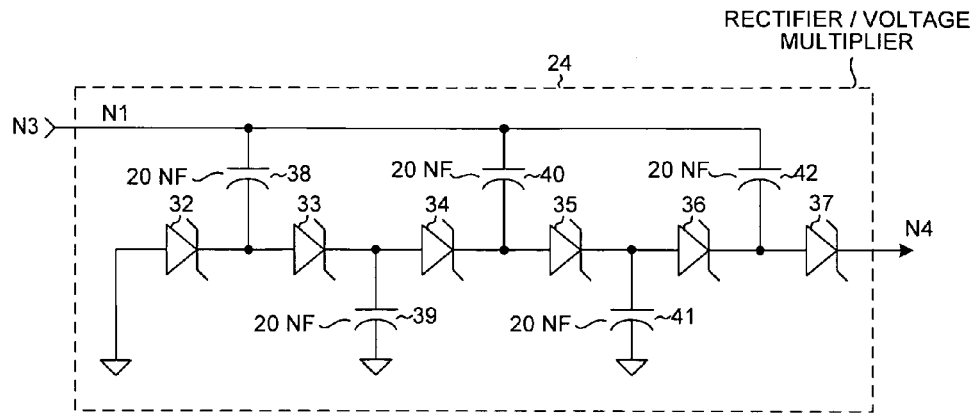
FIG. 3 is a diagram of the rectifier and voltage multiplier of FIG. 2.

FIG. 3 is a more detailed diagram of rectifier and voltage multiplier circuit 24. Rectifier and voltage multiplier circuit 24 is a three-stage Cockcroft-Walton multiplier made out of discrete components. Rectifier and voltage multiplier circuit 24 includes a plurality of low-threshold voltage Schottky diodes 32-37 and a plurality of capacitors 38-42.

Figure 4:
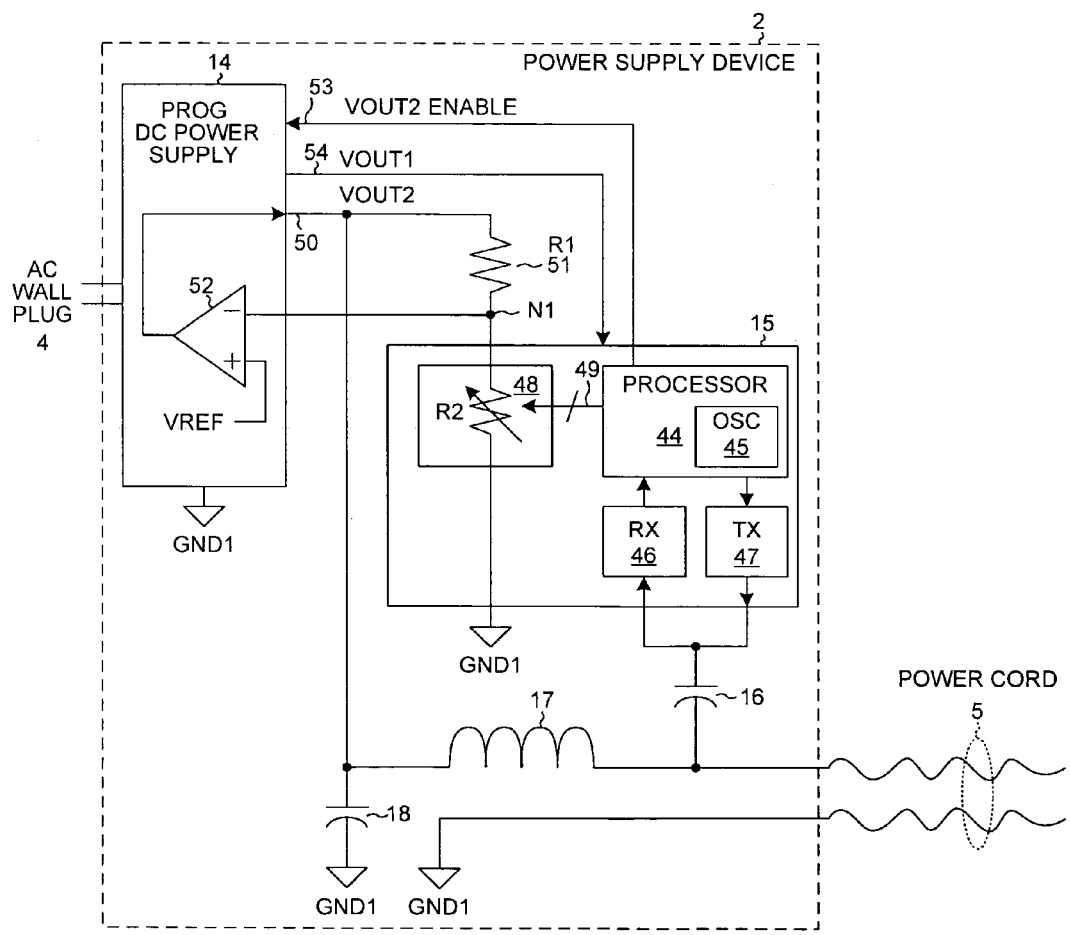
FIG. 4 is a more detailed diagram of power supply device 2 of FIG. 1.

FIG. 4 is a more detailed diagram of power supply device 2. DC-ID CNTR 15 is an integrated circuit that includes an instruction-executing processor 44 that is clocked by an on-chip oscillator 45, receiving circuitry 46, transmitting circuitry 47, and a digitally controlled variable resistor 48. Variable resistor 48 may, for example, be a digital potentiometer involving a resistor ladder and an analog multiplexer. Processor 44 controls the resistance of variable resistor 48 by controlling the digital values on control lines 49. Programmable DC power supply 14 is a typical programmable DC power supply that outputs a programmable voltage VOUT2 onto voltage output terminal 50. The DC amplitude of the voltage VOUT2 output onto terminal 50 is controllable by controlling the magnitude of the resistance R2 of variable resistor 48. The DC amplitude of the voltage output VOUT2 is given by: VOUT2=VREF(1+(R1/R2)), where VREF is a reference voltage (for example, 1.25 volts), where R1 is the resistance of discrete resistor 51, and where R2 is the resistance of variable resistor 48. Device 52 is a differential amplifier in a control loop that has a high current output capability. The details of the control loop of the programmable DC power supply 14 are not illustrated. Any suitable power supply circuit can be used. The control loop illustration and differential amplifier symbol of FIG. 4 are shown in order to explain the manner of controlling a DC power supply using variable resistor 48.

Programmable DC power supply 14 can be disabled from driving a voltage onto output terminal 50 by deasserting the signal VOUT2 ENABLE on input terminal 53. Programmable DC power supply 14 can be enabled to drive a voltage onto terminal 50 by asserting the signal VOUT2 ENABLE onto input terminal 53. Programmable DC power supply 14 also outputs another supply voltage VOUT1 onto output terminal 54. Supply voltage VOUT1 provides constant power to DC-ID CNTR 15 and is not disabled by VOUT2 ENABLE.

Operation of system 1 of FIG. 1 is described below in connection with the waveform diagrams of FIGS. 5-8 and the flowchart of FIG. 9. Initially, DC-ID 19 and the principal DC load circuit 23 of electrical device 3 are unpowered. When electrical device 3 is to be powered by power supply device 2, plug 6 of power supply device 2 is plugged into the DC voltage supply socket 10 of electrical device 3. Programmable DC power supply 14 of power supply device 2 is disabled and is not driving any DC voltage onto VOUT2 output terminal 50. There is no significant DC voltage between the two conductors 8 and 12 of power cord 5. The supply voltage VOUT1 is, however, being output from programmable DC power supply 14 to DC-ID CNTR 15. The processor 44 of DC-ID CNTR 15 is powered and operating.

Figure 5:
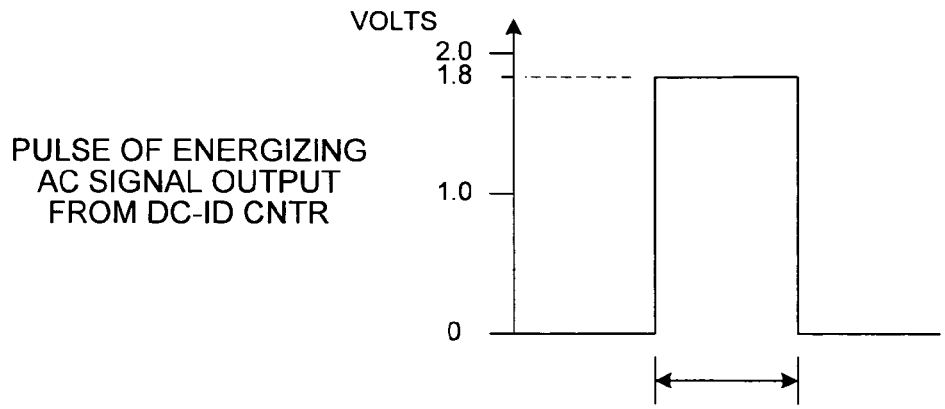
FIG. 5 is a waveform diagram of an energizing pulse as output by DC-ID CNTR onto node N1 of FIG. 1. The waveform is also representative of a digital signal as output by DC-ID onto node N3 during the communication of information from electrical device 3 to power supply device 1.

Once power supply device 2 is plugged into electrical device 3, then DC-ID CNTR 15 outputs a digital pulse train onto node N1. This digital pulse train is considered an AC signal. In the present example, this pulse train has a 1.8 volt magnitude. FIG. 5 is a diagram of one of the pulses.

The digital pulse train is coupled through capacitor 16 onto node N2 and appears on node N2 as a pulse train of spike-shaped pulses. Node N2 is the DC power supply conductor 8 of power cord 5. The pulse train of spike-shaped pulses on node N2 is also considered an AC signal.

Figure 6:
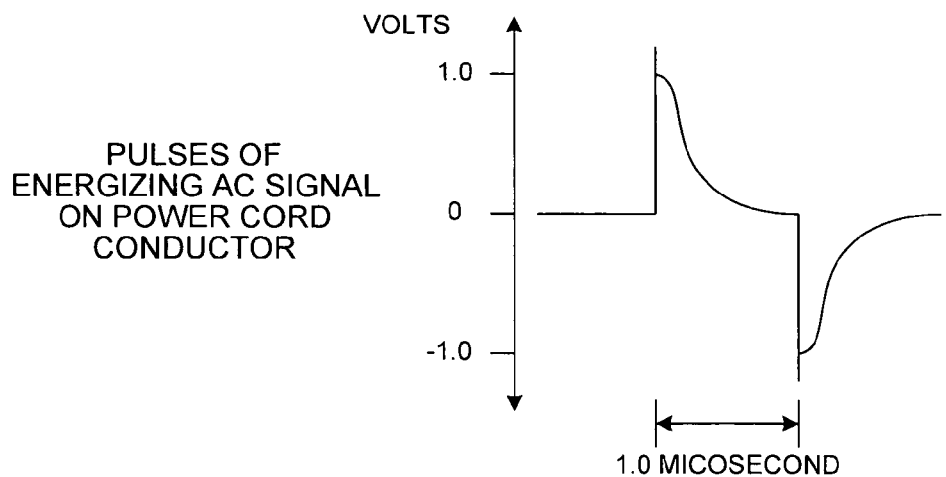
FIG. 6 is a waveform diagram of two energizing pulses as the pulses appear on conductor 8 of power cord 5. The waveform is also representative of pulses on conductor 8 of power cord 5 during the reading back of information from electrical device 3 to power supply device 1.

FIG. 6 is a diagram of what the digital pulse of FIG. 5 looks like when it is coupled onto node N2. The one digital pulse of FIG. 5, when coupled onto node N2, appears on node N2 as a pair of spike-shaped pulses. The 1.8 volt rising edge of the digital pulse of FIG. 5 is coupled onto node N2 and appears as a positive voltage spike having a decaying waveshape and a peak amplitude of approximately one volt. Similarly, the 1.8 volt falling edge of the digital pulse of FIG. 5 is coupled onto node N2 as a negative voltage spike having a decaying waveshape and a peak amplitude of approximately negative one volt.

The pulse train of spike-shaped pulses of FIG. 6 is communicated through plug 6, through socket 10, and into electrical device 3. From node N2 in electrical device 3, the pulse train is coupled through capacitor 20 onto node N3 and to the DC-ID 19. The pulses are rectified and voltage multiplied by the circuit 24 of FIG. 3. Rectifier and voltage multiplier 24 begins to charge energy storage capacitor 25.

Initially, carrier detect circuitry 29 of integrated circuit 26 keeps a signal ENABLE deasserted. This signal ENABLE is supplied to readout and transmitting logic circuitry 31 so that the readout and transmitting logic circuitry 31 is held in the disabled state as energy storage capacitor 25 charges and as the voltage on node N4 increases. Readout and transmitting logic circuitry 31 powers up into a disabled state and can only be enabled by assertion of the signal ENABLE.

Over time, as more pulses of the type illustrated in FIG. 6 are received onto electrical device 2, the local supply voltage on node N4 charges energy storage capacitor 25 to approximately 2.0 to 2.5 volts DC. Once charged, energy storage capacitor stores approximately one milliwatt of power that is available for use by integrated circuit 26. The rough local supply voltage on node N4 is supplied to integrated circuit 26. Voltage regulator 27 of integrated circuit 26 uses the rough local supply voltage to output a regulated 1.8 volt supply voltage onto node N5. The regulated 1.8 volt supply voltage on node N5 is used to power other parts of integrated circuit 26 including on-chip oscillator 28, non-volatile memory 30 and readout and transmitting logic circuitry 31. Once powered, on-chip oscillator 28 outputs a digital clock signal that is supplied to the readout and transmitting logic circuitry 31. The circuitry of integrated circuit 26 is maintained in this state with the oscillator oscillating and the readout and transmitting logic circuitry disabled as long as the pulse train transmitted from power supply device 2 continues.

After outputting a predetermined number of pulses onto plug 6, power supply device 2 stops outputting pulses. Carrier detect circuitry 29 within the DC-ID 19 detects this condition, and asserts the signal ENABLE to readout and transmitting logic circuitry 31. Readout and transmitting logic circuitry 31 is then enabled to read out four bits of information from non-volatile memory 30. Readout and transmitting logic circuitry 31 is a state machine that is clocked by the clock signal output by oscillator 28. The four bits of information, once read out of memory 30, are then driven by readout and transmitting logic circuitry 31 onto node N3, one bit at a time, in modulated form.

Figure 7:
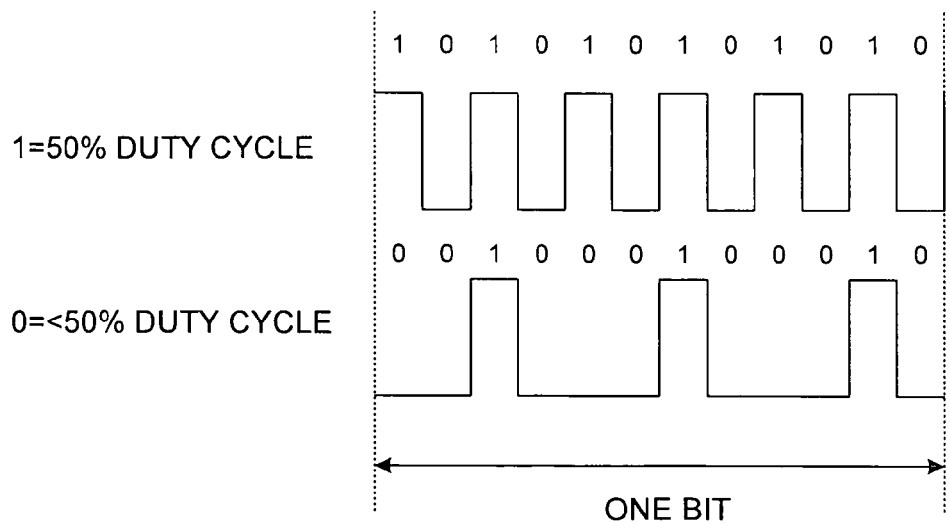
FIG. 7 is a waveform diagram that illustrates how the digital signal output by DC-ID onto node N3 looks when a digital one of information is being communicated from electrical device 3 to power supply device 1, and how the digital signal output by DC-ID onto node N3 looks when a digital zero of information is being communicated from electrical device 3 to power supply device 1.

FIG. 7 is a waveform diagram that illustrates how the digital signal output by DC-ID 19 onto node N3 looks when a digital one of information is being communicated from electrical device 3 to power supply device 1, and how the digital signal output by DC-ID 19 onto node N3 looks when a digital zero of information is being communicated from electrical device 3 to power supply device 1. The modulation is a pulse-skipping frequency shift keying (FSK) scheme. A digital one is modulated as a digital pulse train of a predetermined duration, where the overall duty cycle of the pulse train is fifty percent. A digital zero is modulated as a digital pulse train of the same predetermined duration, where the overall duty cycle of the pulse train is less than fifty percent.

A sequence of four digital pulse trains of the form illustrated in FIG. 7 is driven onto node N3 as the four corresponding bits of information are output. The digital pulses are AC coupled through capacitor 20 onto node N2. Each digital pulse appears on node N2 as a pair of spike-shaped pulses of the type illustrated in FIG. 6. The spike-shaped pulses on node N2 are communicated through socket 10, through plug 6, across power cord 5, and through capacitor 16, and to DC-ID CNTR 15 of power supply device 2. The spike-shaped pulses are converted back into a digital waveform by receiver 46 such that the digital waveform is substantially identical to the digital waveform output by DC-ID 19 onto node N3. If the received digital waveform has a fifty percent duty cycle, then processor 44 determines that a digital one has been received. If the received digital waveform has a duty cycle that is less than fifty percent, then processor 44 determines that a digital zero has been received. In this way, each of the four bits of information is communicated from electrical device 3 to processor 44 in power supply device 2. When four bits of information has been communicated, readout and transmitting logic circuitry 31 stops driving node N3. Processor 44 begins outputting another energizing pulse train via transmitting circuit 47. The energizing digital pulse train is AC coupled through capacitor 16 onto node N2 and appears as a train of spike-shaped pulses of the type illustrated in FIG. 6. As described previously, the energizing pulse train of spike-shaped pulses passes across power cord 5, through plug 6 and socket 10, through capacitor 20 and into DC-ID 19. Energy from this pulse train is used to recharge energy storage capacitor 25. The readout and transmitting logic circuitry 31 is held in a disabled state as long as the pulse train continues to be received onto electrical device 3. When carrier detect circuitry 29 detects that the pulse train is no longer being received onto electrical device 3, then carrier detect circuitry 29 asserts the signal ENABLE that is supplied to readout and transmitting logic circuitry 31. The energy stored in energy storage capacitor 25 is then used to read out the next four bits of information from memory 30 and to output the four bits, one and a time, in modulated form onto node N3. This next four bits of information is communicated as described in connection with the first four bits back to power supply device 2. This process of transferring energy to electrical device 3, reading out four bits of information, and using transferred energy to transmit back the four bits of information to the power supply device 2 is performed repeatedly until a desired number of bits of information has been read out of memory 30 and communicated back to processor 44 in power supply device 2.

Processor 44 analyzes the information and determines how to control programmable DC power supply 14. In the present example, some of the bits of the information are a number that designates a DC voltage that should be supplied onto DC supply voltage socket 10 in order to properly power the principal DC load circuit 23 of electrical device 3. Processor 44 outputs a digital value onto control lines 49 so that the resistance R2 is such that VOUT2 will have the designated voltage amplitude. Processor 44 then asserts VOUT2 ENABLE signal, thereby causing the designated DC supply voltage to be output onto output lead 50. The DC voltage passes through inductor 17, across power cord 5, through plug 6, through socket 10, through inductor 21, and onto a DC voltage input lead 55 of the principal DC load circuit 23. As a result, the principal DC load circuit 23 is powered by energy received from power supply device 2 across the power supply cord 5.

Figure 8:
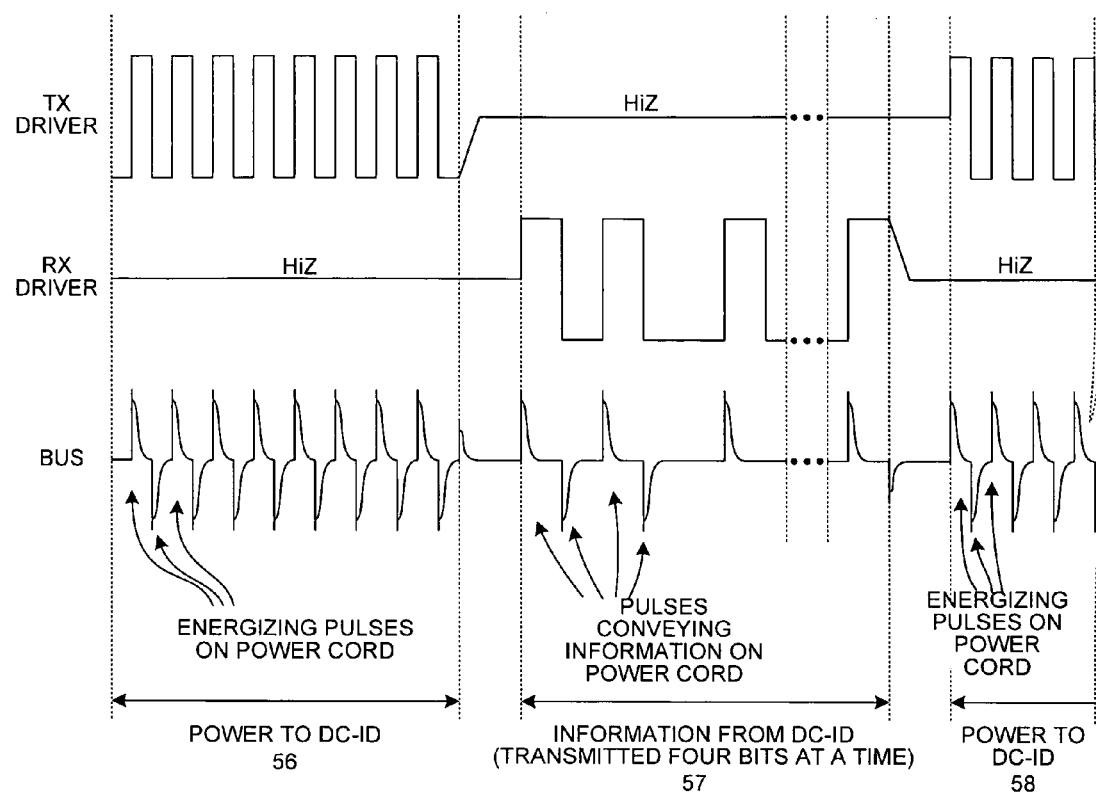
FIG. 8 is a simplified waveform diagram that illustrates the sending of energizing pulses from power supply device 2 to electrical device 3. The diagram also illustrates the sending back of information from electrical device 3 to power supply device 2.

FIG. 8 is a simplified waveform diagram showing an initial energizing pulse train that is sent across the power cord from power supply device 2 to DC-ID 19 of the electrical device 2. This energizing pulse train is sent in initial time period 56. As a result, energy storage capacitor 25 becomes charged. During this time period, the transmitter circuit 47 of power supply device 2 is enabled and driving node N1, whereas the transmitting circuitry 31 of the read out and transmitting logic circuitry 31 of electrical device 3 is in a high-impedance state and is not driving node N3.

In a next time period 57, the carrier detect circuitry 29 detects that the pulse train of time period 56 has stopped. In response, carrier detect circuitry 29 asserts the signal ENABLE, thereby enabling the readout and transmitting logic circuitry 31 of electrical device 3. Energy stored in energy storage capacitor 25 in time period 56 is now used to read four bits of information out of memory 30 and to communicate that information across power cord 5 to power supply device 2 in the form of a pulse train. The transmission circuitry within readout and transmitting logic circuitry 31 is therefore enabled and is driving node N3. The transmitting circuitry 47 of power supply device 2 is in a high-impedance state and is not driving node N1.

In one embodiment, to conserve power while DC-ID 19 is sending information back to power supply device 2, another capacitor (not shown) that is of a smaller capacitance than capacitor 20 is used to capacitively couple DC-ID 19 to node N2 during the transmission. The capacitance of this smaller capacitor is made as small as possible to reduce power consumption when the DC-ID is transmitting, whereas the capacitor 20 is sized to optimize the transfer of energy from conductor 8 into DC-ID 19.

Once four bits of information have been communicated from electrical device 3 to power supply device 2, the process repeats. Reference numeral 58 in FIG. 8 represents the beginning of a subsequent time period wherein energy is sent from power supply device 2 to electrical device 3 in the form of a next set of energizing pulses. It is therefore seen that the communication between power supply device 2 and electrical device 3 is a half-duplex communication in that only one of the two devices is outputting a pulse train onto power cord 5 at a given time.

Figure 9:
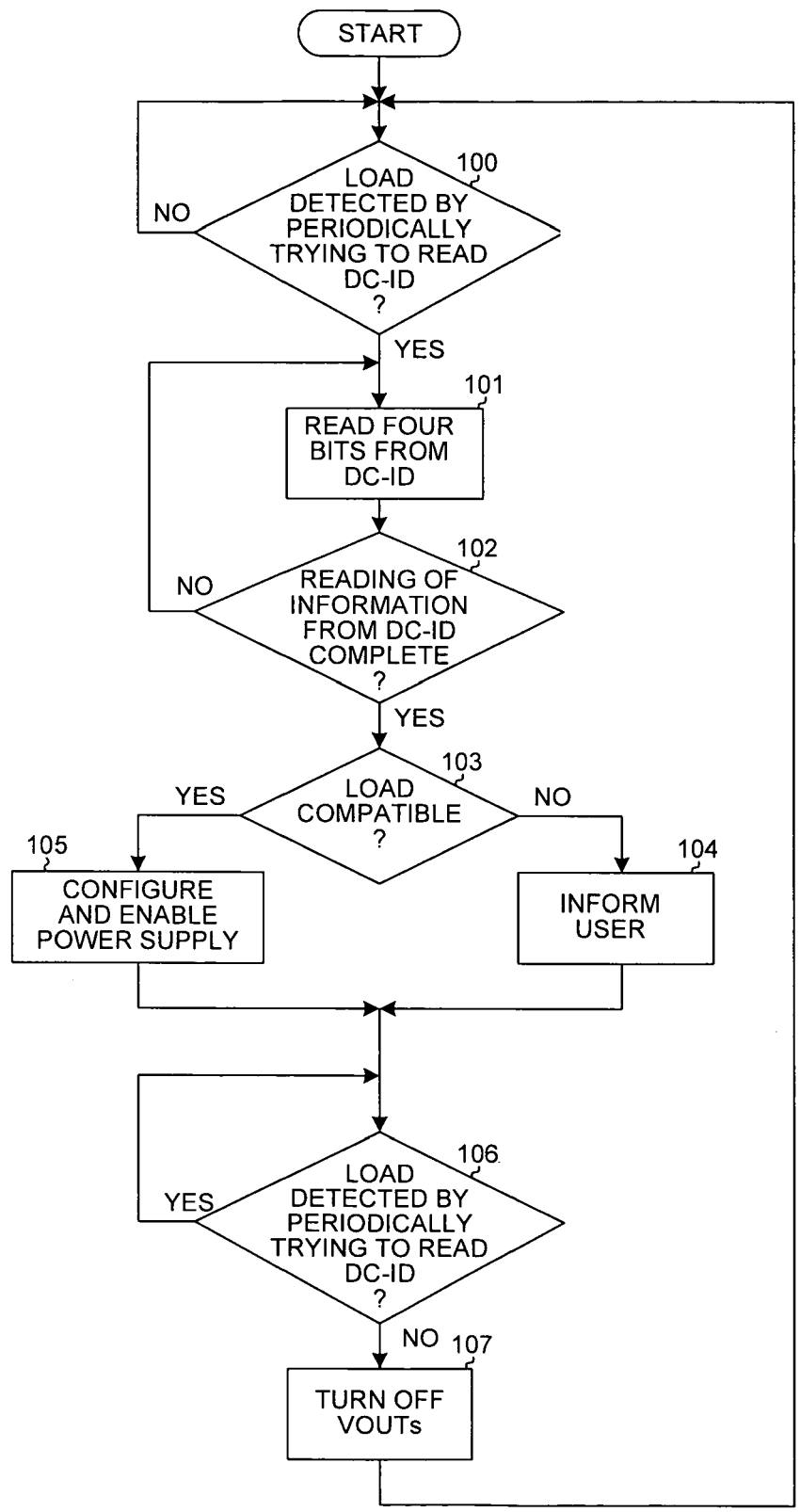
FIG. 9 is a simplified flowchart of a process flow that is performed by software executing in processor 44 of DC-ID CNTR within power supply device 2.

FIG. 9 is a simplified process flow diagram illustrating an operation of system 1 of FIG. 1 from the perspective of processor 44 of power supply device 2. Power supply device 2 periodically checks (step 100) to determine whether it is plugged into an electrical device having a DC-ID. This is done, in one embodiment, by sending out a pulse train as illustrated in FIG. 8 and waiting for a response. If power supply device 2 is properly plugged into a working electrical device 3, then the electrical device 3 will respond by sending back modulated information as illustrated in FIG. 8. If no modulated information is received back, then processor 44 determines that no load has been detected.

If no load is detected, then processing remains in this state with processor 44 periodically attempting detect a load. If, on the other hand, modulated information is received back, then processing proceeds and four bits of information is read from electrical device 3 (step 101) and onto power supply device 2.

If all the information in memory 30 has not been communicated back to power supply device 2, then process of sending out an energizing pulse train and then reading four bits of information back is repeated. If, on the other hand, all the information in memory 30 has been received into processor 44 (step 102), then processor 44 checks (step 103) to confirm that the voltage, current demand, and polarity requirements of electrical device 3 can be met by the power supply device 2. The voltage requirement of electrical device 3 is specified by a number present in the information now in processor 44. The current requirement of electrical device 3 is specified by another number present in the information.

If processor 44 determines that the voltage and current demand requirements cannot be met (for example, the electrical device 3 can draw more current than the programmable DC power supply 14 can deliver reliably), then processor 44 informs the user (step 104) of this situation. In one example, processor 44 drives a light emitting diode (LED) or other indicator on power supply device 2 that is readable by the user. The lighted LED indicates that the power supply device 2 will not try to power the electrical device 3.

If the polarity of the connection between power supply device 2 and electrical device 3 is incorrect, then node N2 in the electrical device 3 may be coupled to conductor 12 in power cord 5 whereas conductor 8 in power cord 8 may be grounded in electrical device 3. In such an incorrect polarity situation, the AC signals on power cord 5 during the read back would be inverted. Accordingly, when electrical device 3 outputs a modulated digital zero having a duty cycle that is less than fifty percent, the power supply device 2 will receive the modulated digital zero as a signal having a duty cycle that is larger the fifty percent. If processor 44 receives information back from electrical device 3 as a sequence of fifty percent duty cycle bits and larger than fifty percent duty cycle bits, then processor 44 determines that the polarity of the connection between power supply device 2 and electrical device 3 is incorrect. In such a situation, processor 44 also drives the light emitting diode (LED) or other indicator on power supply device 2 to indicate the error condition to the user.

If processor 44 determines that the voltage, current, and polarity requirements of the electrical device 3 can be met by power supply device 2, then processor 44 controls the programmable DC power supply 14 as described above such that the DC voltage amplitude is set to the appropriate DC voltage. Once the DC voltage amplitude is set, then processor 44 enables (step 105) the output of the DC voltage onto VOUT2 terminal 50 by asserting VOUT2 ENABLE. Power supply device 2 thereafter powers electrical device 3 by supplying the correct DC voltage as indicated by the information read out of memory 30.

If electrical device 3 becomes disconnected from power supply device 2, then it is desired to turn off programmable DC power supply 14 in order to save power. Conductor 8 of power cord 5 is AC coupled by capacitors 16 and 20 to the DC-ID CNTR 15 in the power supply device 2 and to the DC-ID 19 in the electrical device 3 regardless of whether the programmable DC power supply 14 is outputting VOUT2 or not. The DC-ID CNTR 15 therefore can periodically send out an energizing pulse train and can read back information from memory 30. If information is successfully read back, then it is determined (step 106) that power supply device 2 is still plugged into the electrical device 3 and the programmable DC power supply 14 continues to be enabled to output VOUT2. If, on the other hand, information is not successfully read back, then it is assumed that power supply device 2 is no longer plugged into the electrical device 3. Processor 44 deasserts the VOUT2 ENABLE signal, thereby disabling programmable DC power supply 14 from outputting voltage VOUT2 onto terminal 50.

Multiple Output Power Supply

A consumer may wish to simultaneously power several electrical devices, each of which requires a different DC voltage. For example, the consumer may wish to recharge a cellular telephone, a digital camera, and a digital music player at the same time. In another example, the consumer may wish to power several electrical devices for use with a desktop computer, such as an ethernet switch, a router, and a DSL modem. If multiple AC-to-DC converters are in use at the same time, this creates an annoying clutter. Furthermore, the AC-to-DC converters supplied with consumer electrical devices commonly are formed with a plug emerging directly from a block-shaped body; when such a converter is plugged into an AC socket, the bulky body can impair access to adjacent sockets so that other converters or electrical devices must be plugged in elsewhere. It would be nice for the consumer to have a single AC-to-DC converter that would be usable to power multiple different electrical devices simultaneously while supplying the correct voltage to each of the devices.

Multiple output programmable power supplies exist. These power supplies typically rely upon the user to determine the specification for each electrical device and to set the output voltage for each device, using a switch or other setting means such as a removable key. The removable key uses, for example, a resistor to set the voltage, with different keys for different voltages. These power supplies have several disadvantages. Determining and keeping track of the voltage requirements of individual electrical devices can be inconvenient for the user. In addition, the removable key is unaware of the maximum current demand of the electrical device, which may be higher than the power supply can provide. Finally, when multiple electrical devices are connected to the multiple output power supply, the total power requirement may be higher than the multiple output power supply can provide. There is a need for a moderately-priced multiple output power supply that configures itself, without user input, to power multiple electrical devices at the same time.

A programmable or configurable DC power supply can use a two stage process to convert 110 volt AC line voltage to DC having a chosen voltage. In the first stage, the AC line voltage is converted to an intermediate DC voltage having a fixed magnitude. In the second stage, the intermediate DC voltage is increased (stepped up) or decreased (stepped down) so that it will match the DC voltage requirement of the load in the electrical device.

Figure 10:
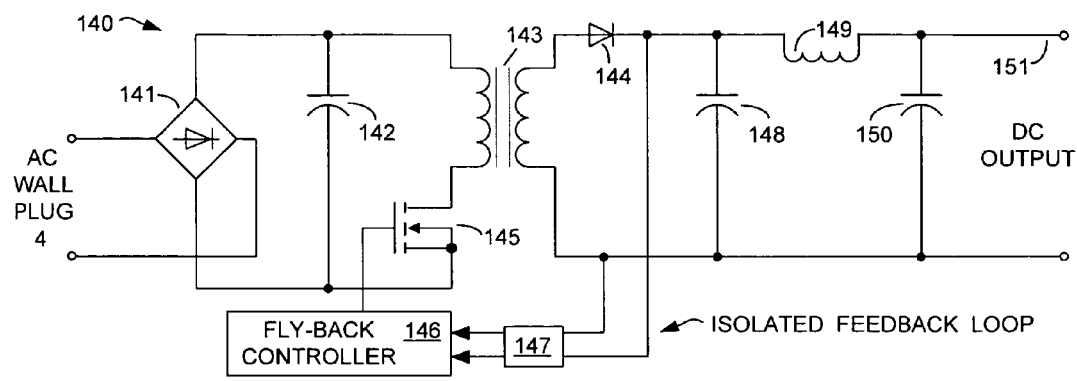
FIG. 10 is a diagram of a prior art fly-back switching mode power supply device 140 that converts an AC input voltage to a DC output voltage.

The first stage conversion can be carried out using a power supply device such as that shown in FIG. 10. FIG. 10 is a diagram of a prior art fly-back switching mode power supply device 140 that converts an AC input voltage to a fixed DC output voltage. When an AC wall plug 4 of power supply device 140 is plugged into an AC wall socket (not shown), the power supply device 140 draws power from the wall socket. A full-wave diode bridge rectifier 141 converts the AC supply voltage to a DC supply voltage which is smoothed by a capacitor 142 and then converted by a transformer 143 to a DC supply voltage of a different magnitude which passes through a diode 144 and an inductor 149 and is output as an intermediate DC supply voltage (DC OUTPUT) onto a voltage output terminal 151.

A flyback switching mode circuit such as that shown in FIG. 10 cycles between a charging stage and a discharging stage. In the charging stage, energy is stored within the magnetic field of transformer 143 thereby inducing a voltage in transformer 143 that opposes the DC supply voltage. During the charging stage, diode 144 blocks current flow from transformer 143 to a capacitor 148 and to voltage output terminal 151. In the discharging stage, which is initiated by opening of a switch 145, the magnetic field of transformer 143 collapses thereby inducing a voltage in the reverse direction from that induced during the charging stage. The reversed voltage tries to create a current, but the open switch 145 prevents current flow. With the voltage reversed, diode 144 now permits current flow through diode 144, capacitor 148, inductor 149, capacitor 150, and voltage output terminal 151. Switch 145 can be a power MOSFET switch controlled by a fly-back controller 146 and an isolated feedback loop 147. Flyback controller 146 can be a UC3844 current mode pulse-width modulation controller, which is available from Texas Instruments of Dallas, Tex.

Figure 11:
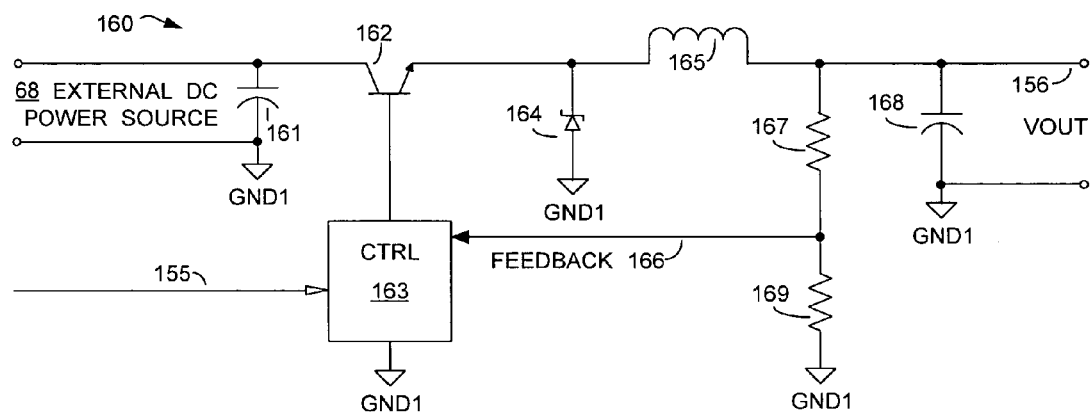
FIG. 11 is a diagram of a prior art buck switching mode DC-to-DC converter 160 that converts a DC input voltage to a lower DC output voltage.
Figure 12:
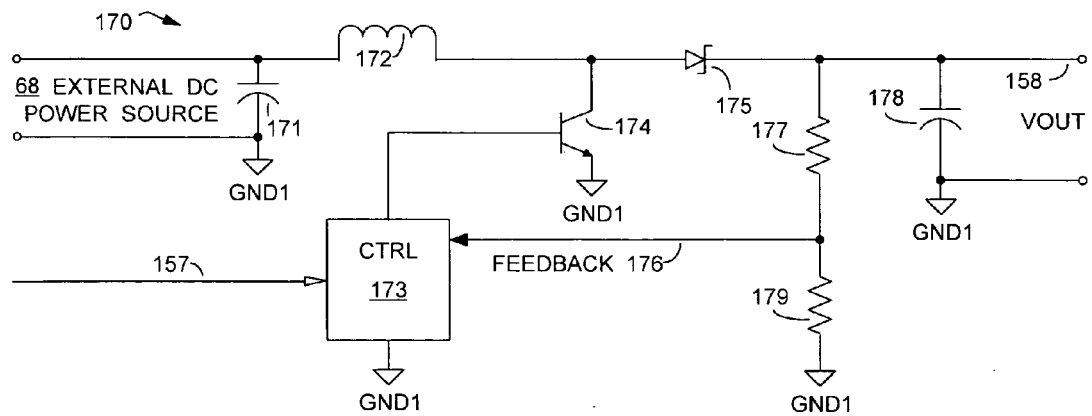
FIG. 12 is a diagram of a prior art boost switching mode DC-to-DC converter 170 that converts a DC input voltage to a higher DC output voltage.

The intermediate DC supply voltage that is output onto voltage output terminal 151 of power supply device 140 has a fixed magnitude that may not be suitable for powering a particular electrical device. The magnitude of the DC voltage can be adjusted in the second stage of power conversion, in which the DC voltage is increased (stepped up) or decreased (stepped down) so that it will match the voltage requirement of the electrical device. The second stage conversion can be carried out using a boost (step up) or buck (step down) DC-to-DC converter or a buck-boost (step down or step up) DC-to-DC converter. FIG. 11 is a diagram of a prior art buck (step down) switching mode DC-to-DC converter 160 that converts a DC input voltage to a DC output voltage having a lower magnitude. FIG. 12 is a diagram of a prior art boost (step up) switching mode DC-to-DC converter 170 that converts a DC input voltage to a DC output voltage having a higher magnitude.

In a two stage programmable power supply that uses either a buck or a boost DC-to-DC converter for the second stage, the input DC voltage (EXTERNAL DC POWER SOURCE) 68 for the DC-to-DC converter can be the intermediate DC supply voltage that is output from power supply device 140.

Buck switching-mode DC-to-DC converter 160 includes a first capacitor 161, a switch 162, a diode 164, an inductor 165, a second capacitor 168, and a voltage output terminal 156. A controller (CTRL) 163 controls switch 162. Controller 163 receives input from feedback 166 which is coupled to resistors 167 and 169. Controller 163 also can receive input on control line 155. Controller 163 and switch 162 can be combined in a switching regulator such as the LT1375 step-down switching regulator that is available from Linear Technologies of Milpitas, Calif.

Boost switching-mode DC-to-DC converter 170 includes a first capacitor 171, an inductor 172, a switch 174, a diode 175, a second capacitor 178, and a voltage output terminal 158. A controller (CTRL) 173 controls switch 174. Controller 173 receives input from feedback 176 which is coupled to resistors 177 and 179. Controller 173 also can receive input on control line 157. Controller 173 and switch 174 can be combined in a switching regulator such as the LT1377 high efficiency switching regulator that is available from Linear Technologies of Milpitas, Calif.

A multiple output programmable power supply that uses two stage power conversion can be produced at lower cost by combining a single first stage power supply device 140 with multiple second stage DC-to-DC converters. The transformer 143 and the power MOSFET switch 145 are moderately expensive components, and using a single power supply device 140 minimizes the expenditure for those components.

Figure 13A:
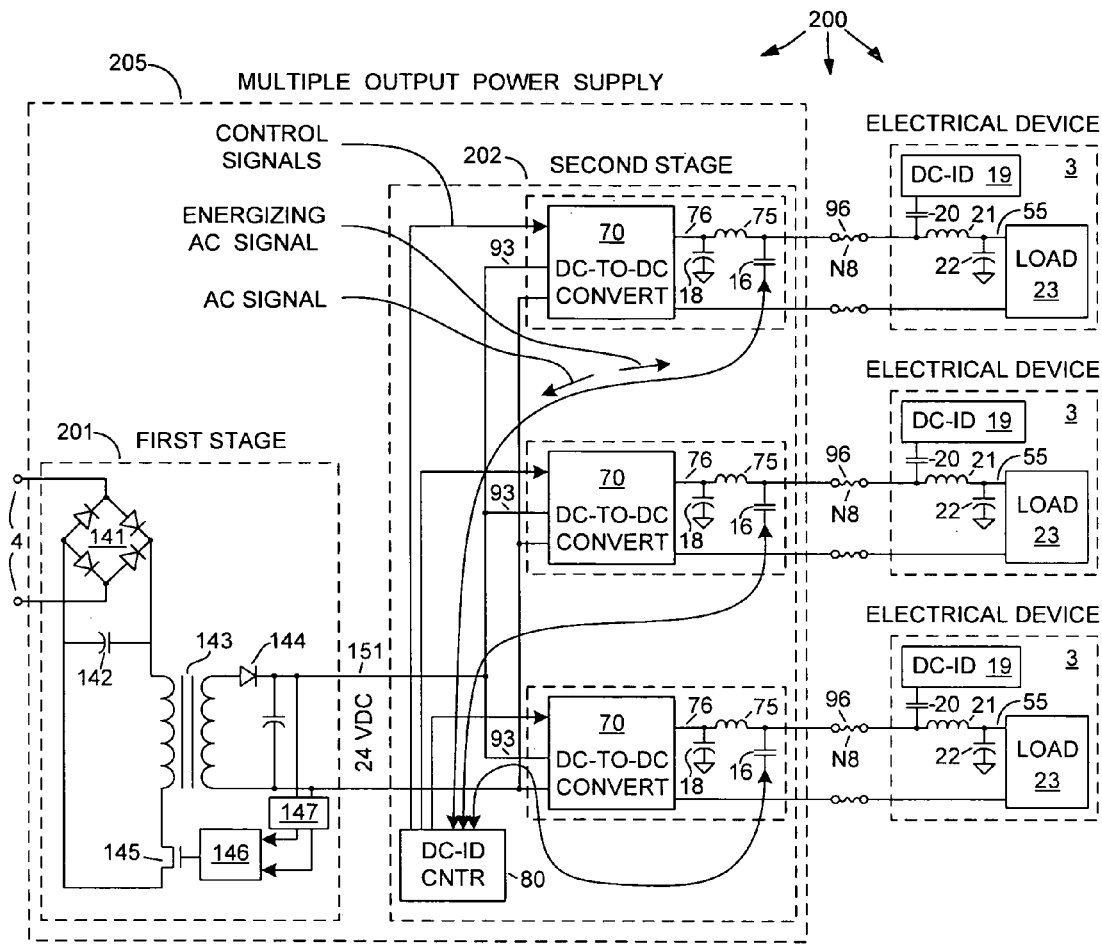
FIG. 13A is a diagram of a system 200 involving a multiple output power supply device 205 and multiple electrical devices 3.

FIG. 13A is a simplified diagram of a system 200 in accordance with one embodiment of the invention. System 200 includes a multiple output power supply device 205 and multiple electrical devices 3. Multiple output power supply device 205 includes a first stage 201, a second stage 202, and an AC wall plug 4.

First stage 201 is a fly-back switching mode power conversion device. First stage 201 includes a full-wave diode bridge rectifier 141, a capacitor 142, a transformer 143, a diode 144, a switch 145, a fly-back controller 146 and an isolated feedback loop 147. When AC wall plug 4 is plugged into an AC wall socket (not shown), first stage 201 receives an AC supply voltage and outputs a DC supply voltage onto voltage output terminal 151. The output DC supply voltage is an intermediate DC supply voltage. In the present example, the intermediate DC supply voltage has a magnitude of 24 volts.

Second stage 202 includes a DC-Identification Controller (DC-ID CNTR) 80 and multiple DC-to-DC converters (DC-TO-DC CONVERT) 70. Associated with each DC-to-DC converter 70 is a first capacitor 18, an inductor 75, and a second capacitor 16. Each DC-to-DC converter 70 receives the intermediate DC supply voltage at a voltage input terminal 93 and outputs a programmable DC voltage onto a voltage output terminal 76.

Each electrical device 3 includes a DC-Identification Device (DC-ID) 19, a first capacitor 20, an inductor 21, a second capacitor 22, and a principal DC load circuit to be powered 23.

Figure 13B:
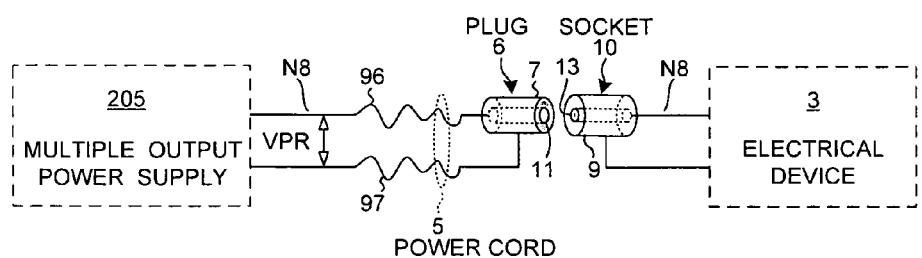
FIG. 13B is a more detailed diagram of a connection between an electrical device 3 and one of the outputs of the multiple output power supply device 205 of FIG. 13A.

FIG. 13B is a more detailed diagram of a connection between an electrical device 3 and one of the outputs of multiple output power supply device 205 of FIG. 13A. For clarity, FIG. 13B depicts only a single output connection and a single electrical device 3, but it is understood that the multiple output power supply device 205 includes multiple output connections. A power cord 5 is attached to the multiple output power supply device 205. Power cord 5 terminates in a DC power connector 6. In the present example, DC power connector 6 is a two-contact male barrel plug often used to supply DC power to electrical devices. Plug 6 has an outer barrel-shaped conductive contact 7 that is coupled to a conductor 96 of power cord 5. Barrel contact 7 is adapted to engage a female barrel shaped contact 9 of a female two-contact socket 10 of the electrical device 3. Plug 6 also has a female inner contact 11 that is coupled to a ground conductor 97 of power cord 5. Female inner contact 11 of Plug 6 is adapted to engage a pin-like inner contact 13 of socket 10 of electrical device 3.

DC-ID CNTR 80 in second stage 202 is AC coupled through capacitor 16 and conductor 96 and capacitor 20 to DC-ID 19 in electrical device 3. Voltage output terminal 76 of DC-to-DC converter 70 is DC coupled through inductor 75 and conductor 96 and inductor 21 to a DC power supply input lead 55 of principal DC load circuit 23 of electrical device 3. The programmable DC voltage VPR is a voltage present between conductor 96 and ground conductor 97.

DC-ID CNTR 80 controls each DC-to-DC converter 70 through control signals (CONTROL SIGNALS). The control signals specify values for several aspects of the operation of each DC-to-DC converter 70, such as the magnitude of the programmable DC voltage that is output and whether the DC-to-DC converter 70 is enabled or disabled. Before enabling DC-to-DC converter 70 to output a programmable DC voltage, DC-ID CNTR 80 outputs an energizing AC signal (ENERGIZING AC SIGNAL) which is received at electrical device 3 and stored as a small amount of energy. Using this stored energy, electrical device 3 sends an AC signal (AC SIGNAL) containing digital information to DC-ID CNTR 80. DC-ID CNTR 80 interprets the digital information received from electrical device 3 and sets appropriate values for DC-to-DC converter 70. Alternatively, if the digital information indicates that electrical device 3 is incompatible with multiple output power supply device 205, DC-ID CNTR 80 causes a user interface to inform the user of the incompatibility, as described further below.

Figure 14:
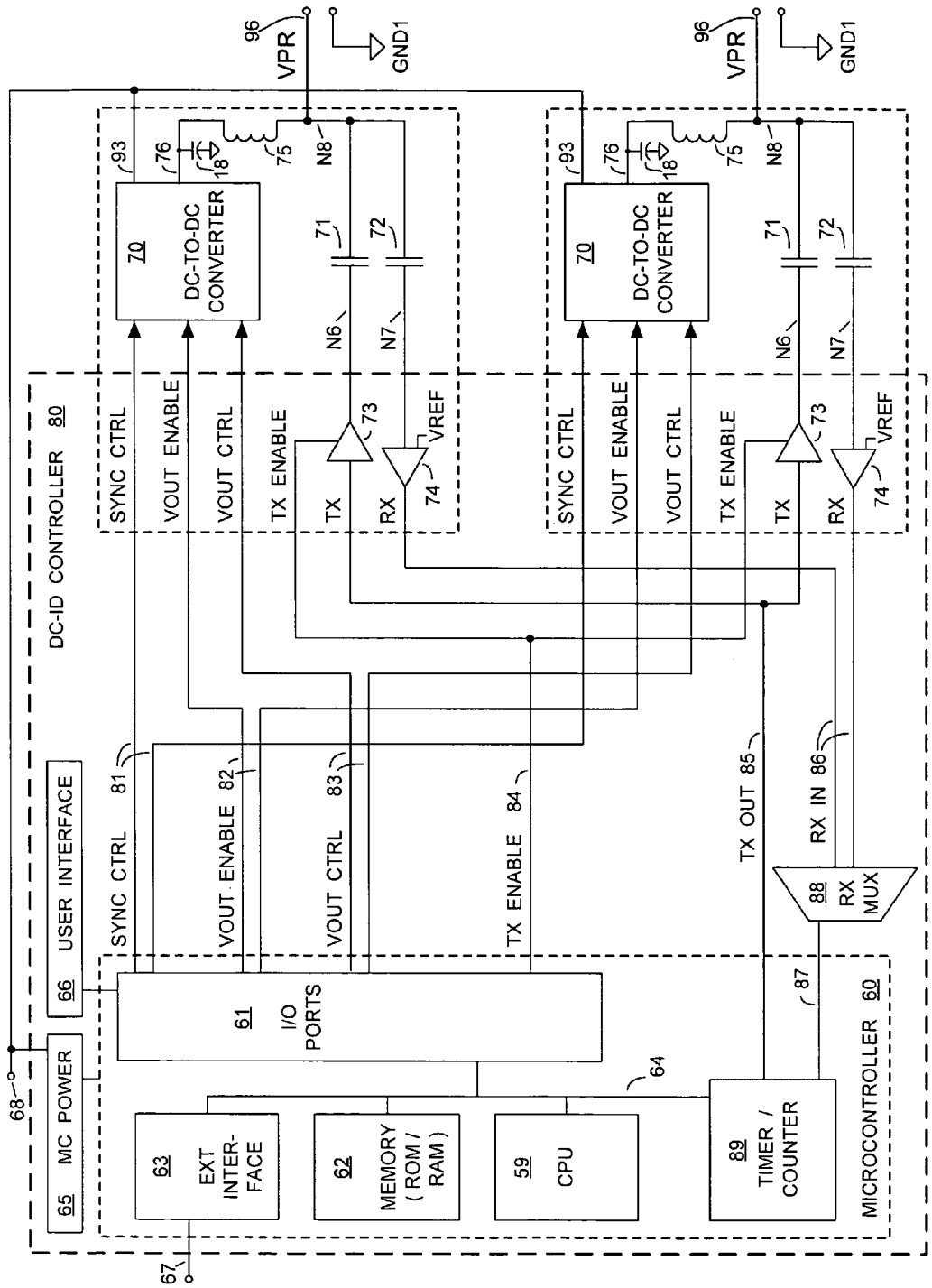
FIG. 14 is a more detailed diagram of the second stage 202 of FIG. 13A.

FIG. 14 is a more detailed diagram of the second stage 202 of FIG. 13A. DC-ID CNTR 80 includes a microcontroller 60 that controls multiple DC-to-DC converters 70. External DC power source 68 supplies power to a power converter (MC POWER) 65 for microcontroller 60 and also supplies power to each DC-to-DC converter 70 through voltage input terminals 93. In this embodiment, external DC power source 68 is the intermediate DC supply voltage output from first stage 201. In another embodiment, external DC power source 68 could be, for example, a DC voltage from an automobile cigarette lighter adapter.

Microcontroller 60 is an integrated circuit that includes a processor (CPU) 59, a memory 62, a timer/counter 89, input/output circuitry (I/O PORTS) 61, and an external interface controller (EXT INTERFACE) 63. DC-ID CNTR 80 includes a user interface controller (USER INTERFACE) 66 that receives information from input/output circuitry 61 about individual outputs of multiple output power supply 205 and relays that information to a user interface (not shown). The user interface can have an on/off button for each output and visual indicators such as light-emitting diodes that display information about individual outputs of multiple output power supply 205. External interface controller 63 is attached to a connector 67 which can be connected to a computer (not shown). The computer can display information about individual outputs of multiple output power supply 205, and the computer user can query and control individual outputs using the computer.

Associated with each DC-to-DC converter 70 is a first capacitor 18, an inductor 75, a second capacitor 71, and a third capacitor 72. For each DC-to-DC converter 70, DC-ID CNTR 80 includes a transmit driver 73 and a receive amplifier 74. Transmit driver 73 is coupled to capacitor 71, and receive amplifier 74 is coupled to capacitor 72. It is possible to use a single capacitor 16 as in FIG. 13A or a pair of capacitors 71 and 72 as in FIG. 14; the latter arrangement can be advantageous in terms of printed circuit board layout. It is preferable that receive amplifier 74 be as close as possible to conductor 96 and the separate capacitors 71 and 72 facilitate this layout. In this embodiment, capacitor 71 has a capacitance of 47 nF and capacitor 72 has a capacitance of 680 pF.

Microcontroller 60 of DC-ID CNTR 80 controls each DC-to-DC converter 70 through three control signals on three control lines. The control signals correspond collectively to the CONTROL SIGNALS of FIG. 13A. The magnitude of the programmable DC voltage output by DC-to-DC converter 70 is controlled by a VOUT CTRL signal on a first control line 83. The enablement of the programmable DC voltage is controlled by a VOUT ENABLE signal on a second control line 82. It can be advantageous to synchronize the switches in the switching mode DC-to-DC converters 70 so that the switches do not turn on and off at the same time. Synchronization of the switches is controlled by a SYNC CTRL signal on a third control line 81. The first, second and third control lines 83, 82 and 81 are coupled to ports of input/output circuitry 61 of microcontroller 60.

Microcontroller 60 of DC-ID CNTR 80 communicates with each electrical device 3 through transmitted and received signals consisting of digital pulse trains that are considered to be AC signals. The transmitted and received signals correspond to the ENERGIZING AC SIGNAL and the AC SIGNAL respectively of FIG. 13A. An energizing AC signal transmitted from microcontroller 60 is communicated through a transmit line (TX OUT) 85, through transmit driver 73 and capacitor 71, through power cord 5 and plug 6, and into electrical device 3. An AC signal received from electrical device 3 is communicated through plug 6 and power cord 5, through capacitor 72 and receive amplifier 74, through a receive line (RX IN) 86, and into microcontroller 60.

When transmitting or receiving AC signals, microcontroller 60 communicates with a single electrical device 3 at a time. When microcontroller 60 is receiving an AC signal, a receive multiplexer (RX MUX) 88 coupled to microcontroller 60 selects a single receive line 86 to be active. When microcontroller 60 is transmitting an energizing AC signal, a control signal TX ENABLE selects a single transmit driver 73 to be active. The TX ENABLE signal is a DC signal on a fourth control line 84 that is coupled to input/output circuitry 61 of microcontroller 60 and to each transmit driver 73.

System 200 of FIG. 13A operates as follows. First stage 201 of multiple output power supply 205 is powered from an AC wall socket (not shown) and outputs an intermediate DC supply voltage onto voltage output terminal 151. Each of the multiple DC-to-DC converters 70 is disabled and is not driving any programmable DC voltage onto voltage output terminal 76. For each DC-to-DC converter 70, there is no significant DC voltage between conductor 96 and ground conductor 97 of power cord 5. The microcontroller 60 of DC-ID CNTR 80 is powered and operating.

Initially, none of the electrical devices 3 is connected to an output of multiple output power supply device 205. For each electrical device 3, DC-ID 19 and principal DC load circuit 23 are unpowered. When an electrical device 3 is to be powered, one of the plugs 6 of multiple output power supply device 205 is plugged into the DC voltage supply socket 10 of the electrical device 3 that is to be powered. The number of outputs connected to electrical devices 3 can change with time, depending upon the needs of the user.

DC-ID CNTR 80 periodically outputs a digital pulse train via transmit driver 73 onto node N6 for a first output of multiple output power supply device 205. This digital pulse train is considered an AC signal, and it is called an energizing AC signal. This digital pulse train or energizing AC signal is AC coupled through capacitor 71 onto node N8 which is the DC power supply conductor 96 of power cord 5. If no electrical device 3 is connected to the first output of multiple output power supply device 205, then no responding AC signal is received by DC-ID CNTR 80. DC-ID CNTR 80 then selects a second output and outputs a digital pulse train onto node N6, as described above.

Alternatively, if an electrical device 3 is connected to the first output, the energizing AC signal is communicated through plug 6, through socket 10, and into electrical device 3. DC-ID 19 in electrical device 3 captures energy from the energizing AC signal. After multiple output power supply device 205 has stopped driving the energizing AC signal onto power cord 5, DC-ID 19 uses the captured energy to read information out of its memory and to transmit the information back to the multiple output power supply device 205. DC-ID 19 transmits the information by outputting a digital pulse train onto node N3 of electrical device 3. The digital pulse train is AC coupled through capacitor 20 onto node N8. The digital pulse train appears on node N8 as a pulse train of spike-shaped pulses, which is considered an AC signal. The AC signal is coupled through capacitor 72 onto node N7. DC-ID CNTR 80 receives the AC signal via receive amplifier 74.

The process of transmitting an energizing AC signal to an electrical device 3 and receiving an AC signal containing information from the electrical device 3 is repeated until all of the information from the electrical device 3 has been received at the DC-ID CNTR 80. This process is described in detail in an earlier section of this application in connection with FIGS. 5-8. In response to this information, microcontroller 60 of DC-ID CNTR 80 interprets the information and uses the information to control the DC-to-DC converter 70 that is DC coupled to the electrical device 3 through power cord 5 and plug 6. Controlling the DC-to-DC converter 70 can include setting a magnitude, a polarity and a current limit for the programmable DC voltage that will be output by the DC-to-DC converter 70. The settings depend upon the information received and interpreted by microcontroller 60. In one embodiment, the polarity can be set by setting the magnitude of the programmable DC voltage to a negative value. In another embodiment, the programmable DC voltage cannot be negative. If DC-ID CNTR 80 detects reversed polarity, DC-ID CNTR 80 notifies the user, through the user interface, to reverse the polarity of the plug that connects electrical device 3 to multiple output power supply device 205.

Microcontroller 60 outputs onto first control line 83 a digital or analog value that signals to DC-to-DC converter 70 the magnitude for the programmable DC voltage that will be output. DC-to-DC converter 70 uses that value to set the magnitude of the programmable DC voltage. Microcontroller 60 then asserts the VOUT ENABLE signal on second control line 82 thereby causing DC-to-DC converter 70 to output the designated programmable DC voltage onto voltage output terminal 76. The programmable DC voltage passes through inductor 75, across power cord 5, through plug 6, through socket 10, through inductor 21, and onto a DC voltage input lead 55 of the principal DC load circuit 23. As a result, the principal DC load circuit 23 is powered by energy received from multiple output power supply 205 across power cord 5.

Depending upon the needs of the user, there can be zero, one, or several electrical devices 3 connected to outputs of multiple output power supply 205. DC-ID CNTR 80 sends energizing AC signals to each output periodically in a round-robin process. If an electrical device 3 is connected to one of the outputs, DC-ID CNTR 80 receives information in return, as described previously. DC-ID CNTR 80 then uses the information to set the magnitude, polarity, and current limit of the programmable DC voltage and enables the DC-to-DC converter 70 to output the programmable DC voltage. DC-ID CNTR 80 then repeats the checking and setting process for each DC-to-DC converter 70 in turn.

Figure 15:
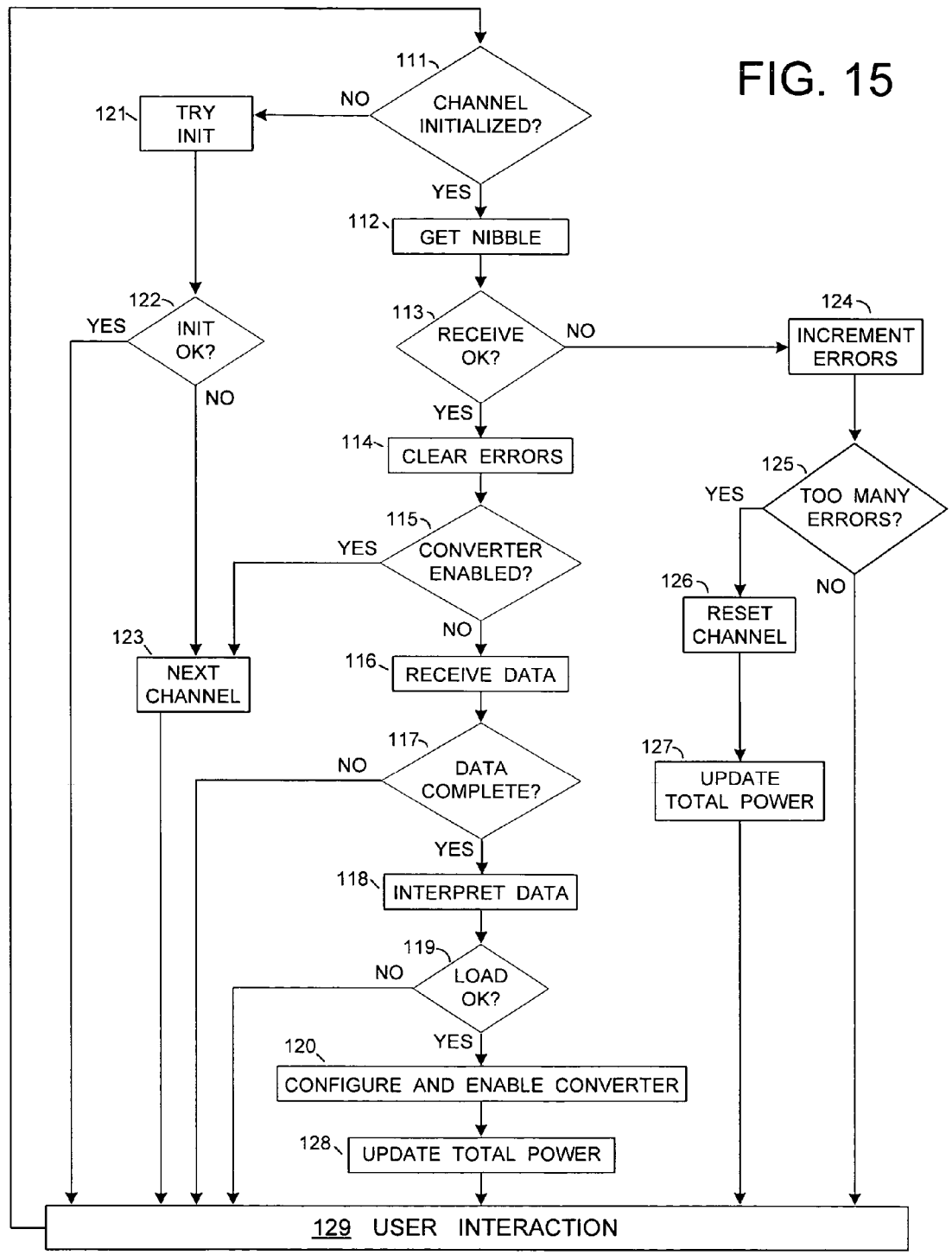
FIG. 15 is a simplified flowchart of a process flow that is performed by software executing in processor 59 of microcontroller 60 of DC-ID CNTR 80 within multiple output power supply device 205.

FIG. 15 is a simplified flowchart of one embodiment of a process flow that is performed by software executing in processor 59 of microcontroller 60 of DC-ID CNTR 80. From the perspective of microcontroller 60, the transmitting and receiving of AC signals between microcontroller 60 and electrical device 3 occurs over a communication channel. Microcontroller 60 initially selects a channel and checks a stored value that indicates whether the selected channel is initialized (step 111). If the selected channel is not initialized, microcontroller 60 tries to initialize the channel (step 121) by enabling the transmit driver 73 associated with that channel, outputting an energizing AC signal onto conductor 96, disabling transmit driver 73, selecting the receive line 86 for the same channel, and receiving any reply signal through the receive amplifier 74 for the same channel. If an AC signal is received in reply (step 122), indicating that an electrical device 3 is connected, the channel initialization has succeeded and the successful initialization of the channel is indicated in the user interface (step 129). If the initialization fails, microcontroller 60 selects the next channel (step 123) and this new selection is indicated in the user interface (step 129).

Microcontroller 60 checks whether the newly selected channel is already initialized (step 111). If it is initialized, microcontroller 60 sends an energizing AC signal and receives an AC signal in reply (step 112), as described for step 121. Microcontroller 60 checks for problems in the received reply (step 113), and if problems exist an error counter is incremented (step 124). If the error count exceeds a limit value (step 125), the channel is reset (step 126). Channel reset (step 126) includes disabling the DC-to-DC converter 70 associated with the channel, if it is enabled, erasing any data in memory 62 pertaining to the channel, and updating (step 127) the value for the total power supplied to all outputs of multiple output power supply device 205 by subtracting the value for the power that previously was supplied to the newly-disabled DC-to-DC converter 70. The channel status, which reflects the error count, is indicated in the user interface (step 129). If there are no problems in the received response (step 113), the error counter is cleared (step 114).

Next, microcontroller 60 checks (step 115) whether the DC-to-DC converter 70 associated with the selected channel is enabled to output a programmable DC voltage. If the selected channel is already enabled, microcontroller 60 selects the next channel (step 123). If the selected channel is not already enabled, microcontroller 60 sends energizing AC signals to electrical device 3 and receives information in return (step 116), as described previously. Microcontroller 60 checks whether the information received about electical device 3 is complete (step 117). If the information is incomplete, it is impossible to properly configure DC-to-DC converter 70, and this status is indicated in the user interface (step 129). If the information from electrical device 3 is complete, microcontroller 60 interprets the information (step 118) to ascertain the voltage, maximum current demand, and polarity requirements of electrical device 3.

Microcontroller 3 checks (step 119) whether the load requirements can be met by multiple output power supply device 205. The load requirements include the voltage and maximum current demand requirements of the electrical device 3 associated with the selected channel, and the total power required for all electrical devices 3 connected to multiple output power supply device 205. If the DC-to-DC converter 70 cannot supply the voltage or maximum current required by electrical device 3, or if the first stage cannot supply the total power required by all enabled DC-to-DC converters 70, then the load requirements cannot be met and this status is indicated in the user interface (step 129).

If the load requirements can be met, microcontroller 60 configures DC-to-DC converter 70 so that it can output a programmable DC voltage of the required magnitude and polarity, and then enables DC-to-DC converter 70 (step 120). Microcontroller 60 then updates (step 128) the value for the total power supplied to all outputs of multiple output power supply device 205 by adding the value for the power supplied to the newly-enabled DC-to-DC converter 70. The successful configuration and enablement of DC-to-DC converter 70 is indicated in the user interface (step 129). After each user interaction (step 129), microcontroller 60 repeats the process depicted in FIG. 15, starting with step 111.

Figure 16:
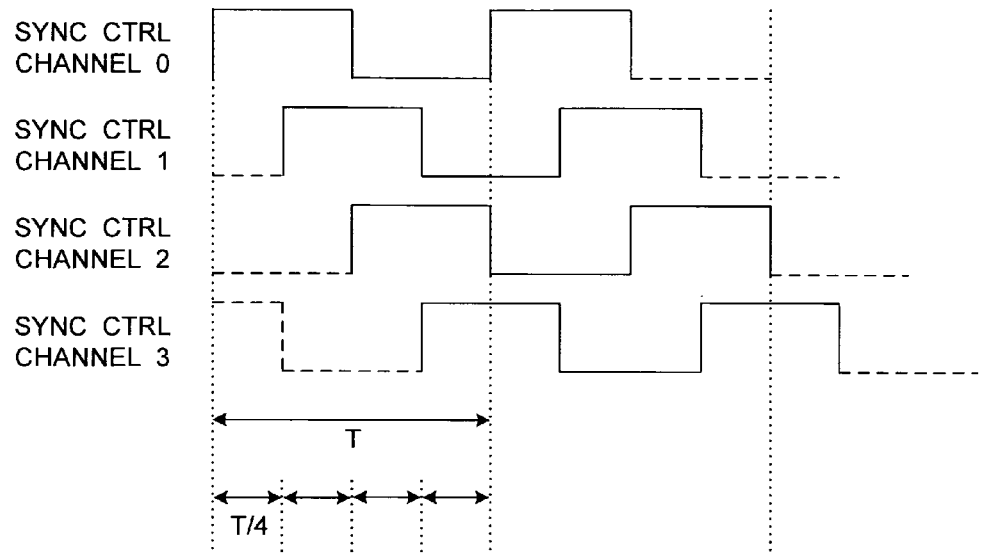
FIG. 16 is a waveform diagram that illustrates the timing of signals for synchronizing multiple DC-to-DC converters 70 in a multiple output power supply 205.

It can be advantageous to synchronize the switches in the switching mode DC-to-DC converters 70 so that the switches do not turn on and off at the same time. Synchronizing the switches to turn on and off in a staggered sequence minimizes the peak current drawn from the intermediate DC supply voltage that is output by first stage 201. FIG. 16 is a waveform diagram that illustrates the timing of signals for synchronizing the switches of four DC-to-DC converters 70 in a multiple output power supply 205. Synchronization of the switches can be controlled by the SYNC CTRL signal. Microcontroller 60 outputs the SYNC CTRL signal onto each third control line 81, and the SYNC CTRL signal is received at the controller within each DC-to-DC converter 70. The controller is controller 163 in the buck DC-to-DC converter depicted in FIG. 11, or controller 173 in the boost DC-to-DC converter depicted in FIG. 12.

It can be advantageous to monitor the status of an electrical device 3 that is powered by multiple output power supply device 205. If DC-ID CNTR 80 has status information about electrical device 3, DC-ID CNTR 80 can use that information for various purposes such as increasing the safety of the system 200 depicted in FIG. 13A. Status information can include, for example, temperature information, fault condition information, humidity information, watchdog timer information, fan condition information, and on/off information.

DC-ID CNTR 80 can receive status information as digital information transmitted from electrical device 3. The digital information is carried in an AC signal that is present on conductor 96 at the same time that a programmable DC voltage is present on conductor 96. DC-ID CNTR 80 receives status information as an AC signal that is present on power cord 5 and plug 6 at the same time that DC-to-DC converter 70 is outputting a programmable DC voltage on power cord 5 and plug 6.

Figure 17:
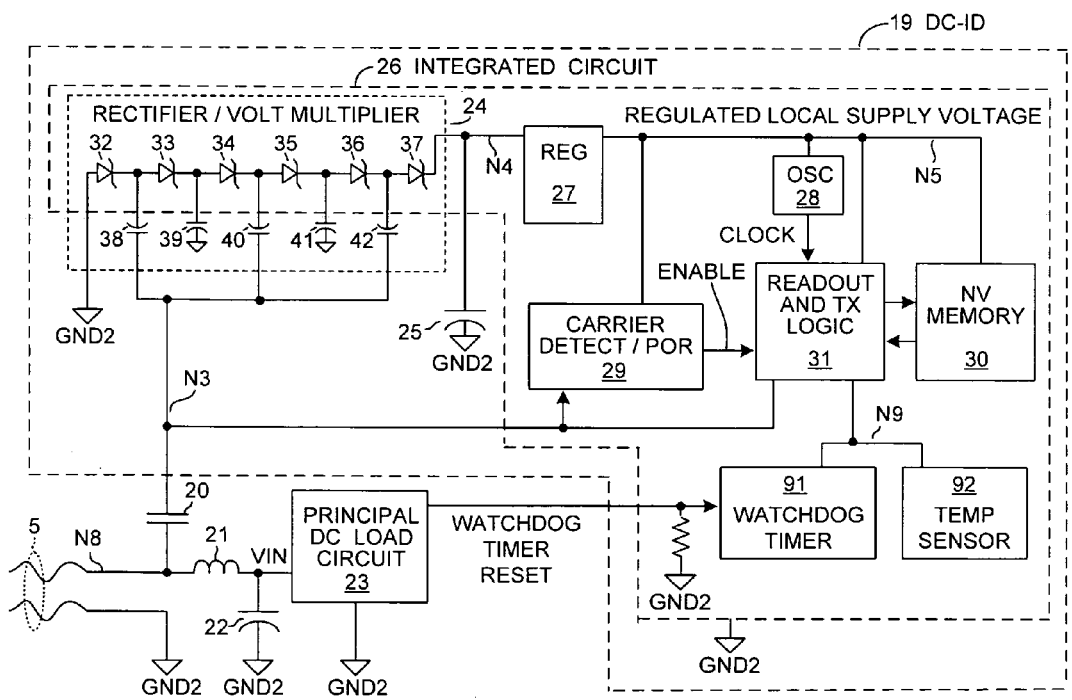
FIG. 17 is a diagram of an electrical device 3 that includes a watchdog timer 91 and a temperature sensor 92.

FIG. 17 is a diagram of an electrical device 3 that includes a watchdog timer 91 and a temperature sensor (TEMP SENSOR) 92 coupled to readout and transmitting logic circuitry 31. Watchdog timer 91 is periodically reset by a WATCHDOG TIMER RESET signal from principal load circuit 23, unless some error condition or problem prevents the sending of the signal. In one embodiment, if watchdog timer 91 times out because of an error condition, or if temperature sensor 92 senses an out-of-range temperature, a warning signal is output to node N9. Readout and transmitting logic circuitry 31 receives the warning signal from node N9, processes the information in the signal, and outputs a digital signal as an AC signal onto node N3. The digital signal contains status information about electrical device 3. The AC signal containing status information passes through capacitor 20 and onto node N8 and is received at DC-ID CNTR 80. Microconroller 60 of DC-ID CNTR 80 interprets the status information and responds by, for example, disabling DC-to-DC converter 70 so that it no longer outputs a programmable DC voltage. Microcontroller 60 can also cause status information about electrical device 3 to be displayed using visual indicators in the user interface of multiple output power supply device 205.

To reduce cost, certain parts of the rectifier and voltage multiplier circuit 24 can be integrated within integrated circuit 26 as in the embodiment illustrated in FIG. 17, rather than outside of integrated circuit 26 as illustrated in FIG. 2 and FIG. 3. In FIG. 17, diodes 32-37 are within integrated circuit 26, whereas capacitors 38-42 are outside of integrated circuit 26. Inclusion of diodes 32-37 within integrated circuit 26 depends upon using a CMOS manufacturing process that is capable of forming low voltage rectifiers that implement diodes 32-37.

Although the present invention has been described in connection with certain specific embodiments for instructional purposes, the present invention is not limited thereto. The rate of pulses send across power cord 5, both in the energizing period of operation and in the read back period of operation, can be pseudo-random frequency modulated if need be to disperse electro-magnetic radiation radiated from the system 1. Where the programmable DC power supply 14 outputs a signal that indicates the power supply is supplying power to a DC load, this signal can be used by processor 44 to detect the presence of electrical device 3 in the process of FIG. 9 rather than periodically trying to read information back from DC-ID 19 during the operation of electrical device 3. The technique set forth in connection with FIG. 9 of periodically trying to read information back from DC-ID 19, however, is advantageous in that it detects the presence of electrical device 3 in a situation in which electrical device 3 is coupled to power supply device 2 via power cord 5 but where the principal DC load circuitry 23 has been turned off. In some embodiments, digital information is sent from power supply device 2 to electrical device 3 in the same pulse train that delivers energy to electrical device 3. In some embodiments, power supply device 2 has switches for flipping the polarity of the DC voltage driven onto power cord 5. If the duty cycle of information read back indicates an incorrect polarity as set forth above, then processor 44 controls the switches such that when programmable DC power supply 14 is enabled the proper polarity voltage is output to electrical device 3. Accordingly, various modifications, adaptations, and combinations of various features of the described embodiments can be practiced without departing from the scope of the invention as set forth in the claims.

What is claimed is:

1. A power supply comprising:
    a first stage that receives an AC supply voltage and that outputs a DC supply voltage; and
    a second stage comprising:
        a first DC-to-DC converter that receives the DC supply voltage and that is capable of outputting a first programmable DC voltage onto a first conductor;
        a second DC-to-DC converter that receives the DC supply voltage and that is capable of outputting a second programmable DC voltage onto a second conductor; and
        a DC-ID controller that is AC coupled to the first conductor, wherein the DC-ID controller receives first information from the first conductor and in response controls the first DC-to-DC converter such that the first programmable DC voltage has a first magnitude that is dependent upon the first information received from the first conductor, and wherein the DC-ID controller is AC coupled to the second conductor, wherein the DC-ID controller receives second information from the second conductor and in response controls the second DC-to-DC converter such that the second programmable DC voltage has a second magnitude that is dependent upon the second information received from the second conductor.

2. The power supply of claim 1,
    wherein the first programmable DC voltage is a voltage present between the first conductor and a first ground conductor, wherein the first conductor and the first ground conductor are conductors of a first DC power connector, wherein the first information is first digital information carried in a first AC signal present on the first conductor, wherein the first AC signal is present on the first conductor when there is substantially no DC voltage between the first conductor and the first ground conductor, and wherein the DC-ID controller in response to receiving the first information controls the first DC-to-DC converter such that the first programmable DC voltage has the first magnitude, and
    wherein the second programmable DC voltage is a voltage present between the second conductor and a second ground conductor, wherein the second conductor and the second ground conductor are conductors of a second DC power connector, wherein the second information is second digital information carried in a second AC signal present on the second conductor, wherein the second AC signal is present on the second conductor when there is substantially no DC voltage between the second conductor and the second ground conductor, and wherein the DC-ID controller in response to receiving the second information controls the second DC-to-DC converter such that the second programmable DC voltage has the second magnitude.

3. The power supply of claim 2, wherein the DC-ID controller is capable of receiving third digital information carried in a third AC signal, the third AC signal being present on the first conductor when the first programmable DC voltage of the first magnitude is present on the first conductor, wherein the third digital information is status information about a first electrical device, the first electrical device being a device that is powered by the power supply through the first DC power connector, wherein the status information is taken from the group consisting of: temperature information, fault condition information, humidity information, watchdog timer information, fan condition information, on/off information.

4. The power supply of claim 2, wherein the first AC signal is a first pulse train of spike-shaped pulses, and wherein the second AC signal is a second pulse train of spike-shaped pulses.

5. The power supply of claim 1, wherein the first information is received across a first power cord and into the DC-ID controller, the first power cord having no more than two conductors, and wherein the second information is received across a second power cord and into the DC-ID controller, the second power cord having no more than two conductors.

6. The power supply of claim 1, wherein the DC-ID controller can control the first DC-to-DC converter such that the first magnitude is a negative value, and wherein the DC-ID controller can control the second DC-to-DC converter such that the second magnitude is a negative value.

7. The power supply of claim 1, wherein the DC-ID controller receives third digital information carried in the first AC signal, wherein the third digital information is status information about a first electrical device, the first electrical device being a device that is connected to the first conductor, wherein the status information is taken from the group consisting of: temperature information, fault condition information, humidity information, watchdog timer information, fan condition information, on/off information.

8. The power supply of claim 1, wherein the DC-ID controller receives third digital information carried in a third AC signal, wherein the third AC signal is present on the first conductor at a time when the first programmable DC voltage of the first magnitude is not present on the first conductor, wherein the third digital information is status information about a first electrical device, the first electrical device being a device that is connected to the first conductor, wherein the status information is taken from the group consisting of: temperature information, fault condition information, humidity information, watchdog timer information, fan condition information, on/off information.

9. The power supply of claim 1, wherein the DC-ID controller maintains information about a maximum power output capability of the first stage, wherein the DC-ID controller maintains information about a maximum power output setting of the first DC-to-DC converter, wherein the DC-ID controller maintains information about a maximum power output setting of the second DC-to-DC converter, and wherein the DC-ID controller controls the first and second DC-to-DC converters such that the maximum power output capability of the first stage is not exceeded.

10. A method comprising:
(a) receiving a first AC signal onto a first contact of a first DC power connector, the first DC power connector being a part of a power supply, the first DC power connector also having a second contact, wherein there is substantially no DC voltage between the first and second contacts during the receiving of (a), wherein the first AC signal carries first information;
(b) the power supply using the first information to output a first programmable DC voltage onto the first DC power connector;
(c) receiving a second AC signal onto a first contact of a second DC power connector, the second DC power connector being a part of the power supply, the second DC power connector also having a second contact, wherein there is substantially no DC voltage between the first and second contacts during the receiving of (c), wherein the second AC signal carries second information; and
(d) the power supply using the second information to output a second programmable DC voltage onto the second DC power connector.

11. The method of claim 10, wherein the power supply uses the first information to determine a magnitude of the first programmable DC voltage, and wherein the power supply uses the second information to determine a magnitude of the second programmable DC voltage.

12. The method of claim 10, wherein the power supply comprises a first stage, a first DC-to-DC converter, and a second DC-to-DC converter, the method further comprising:
(e) receiving an AC supply voltage onto the first stage of the power supply, the first stage outputting an intermediate DC voltage;
(f) using the first DC-to-DC converter to convert the intermediate DC voltage into the first programmable DC voltage; and
(g) using the second DC-to-DC converter to convert the intermediate DC voltage into the second programmable DC voltage.

13. The method of claim 12, wherein the power supply comprises a microcontroller, wherein the microcontroller interprets the first information and controls the first DC-to-DC converter so that the first DC-to-DC converter outputs the first programmable DC voltage, wherein the microcontroller interprets the second information and controls the second DC-to-DC converter so that the second DC-to-DC converter outputs the second programmable DC voltage.

14. The method of claim 10, further comprising:
(e) prior to (a) outputting a first energizing AC signal onto the first contact of the first DC power connector, wherein energy of the first energizing AC signal is used to generate the first AC signal received in (a); and
(f) prior to (c) outputting a second energizing AC signal onto the first contact of the second DC power connector, wherein energy of the second energizing AC signal is used to generate the second AC signal received in (c).

15. The method of claim 10, further comprising:
(e) receiving a third AC signal onto the first contact of the first DC power connector, the third AC signal being present on the first contact when the first programmable DC voltage is present on the first contact, the third AC signal carrying third information, wherein the third information is status information about a first electrical device, the first electrical device being a device that is powered by the power supply through the first DC power connector, wherein the status information is taken from the group consisting of: temperature information, fault condition information, humidity information, watchdog timer information, fan condition information, on/off information.

16. The method of claim 15, wherein the power supply comprises a visual indicator, the method further comprising:
(f) indicating the status information on the visual indicator of the power supply.

17. The method of claim 10, wherein the first DC power connector has no more than two contacts, and wherein the second DC power connector has no more than two contacts.

18. The method of claim 10, wherein the power supply uses the first information to determine a polarity of the first programmable DC voltage, and wherein the power supply uses the second information to determine a polarity of the second programmable DC voltage.

19. The method of claim 10, wherein the power supply uses the first information to determine a current limit of the first programmable DC voltage, and wherein the power supply uses the second information to determine a current limit of the second programmable DC voltage.

20. The method of claim 10, wherein a first electrical device is coupled to the power supply and as a result the first AC signal is transmitted from the first electrical device to the power supply, whereupon the power supply automatically outputs the first programmable DC voltage to the first electrical device.

21. A power supply comprising:
a first DC power connector, the first DC power connector having a first contact and a second contact;
a second DC power connector, the second DC power connector having a first contact and a second contact; and
means for receiving a first AC signal onto the first DC power connector when there is substantially no DC voltage between the first and second contacts of the first DC power connector, the means also being for outputting a first DC voltage onto the first DC power connector, wherein a magnitude of the first DC voltage depends upon first information carried in the first AC signal, the means also being for receiving a second AC signal onto the second DC power connector when there is substantially no DC voltage between the first and second contacts of the second DC power connector, the means also being for outputting a second DC voltage onto the second DC power connector, wherein a magnitude of the second DC voltage depends upon second information carried in the second AC signal.

22. The power supply of claim 21, wherein the means comprises a microcontroller integrated circuit, a first DC-to-DC converter and a second DC-to-DC converter, wherein the microcontroller integrated circuit is AC coupled to the first DC power connector and is AC coupled to the second DC power connector, the microcontroller integrated circuit controlling the first DC-to-DC converter and also controlling the second DC-to-DC converter.

23. The power supply of claim 21, wherein the means is also for receiving a third AC signal onto the first DC power connector, the third AC signal carrying status information about an electrical device coupled to the power supply, wherein the status information is taken from the group consisting of: temperature information, fault condition information, humidity information, watchdog timer information, fan condition information, on/off information.

24. The power supply of claim 21, wherein the means is also for outputting a first energizing AC signal onto the first DC power connector, wherein energy of the first energizing AC signal is used to generate the first AC signal, and wherein the means is also for outputting a second energizing AC signal onto the second DC power connector, wherein energy of the second energizing AC signal is used to generate the second AC signal.

* * * * *